US005786803A

United States Patent [19]

Hernandez et al.

[11] Patent Number: 5,786,803

[45] Date of Patent: *Jul. 28, 1998

[54] SYSTEM AND METHOD FOR ADJUSTING THE ILLUMINATION CHARACTERISTICS OF AN OUTPUT DEVICE

[75] Inventors: Mathew Hernandez, El Granada; Richard D. Cappels, Sr., San Jose; Jesse Michael Devine, Sunnyvale, all of Calif.

[73] Assignee: Apple Computer, Inc., Cupertino, Calif.

[*] Notice: The term of this patent shall not extend beyond the expiration date of Pat. No. 5,670,985.

[21] Appl. No.: 309,165

[22] Filed: Sep. 20, 1994

Related U.S. Application Data

[63] Continuation-in-part of Ser. No. 240,002, May 9, 1994.

[51] Int. Cl.⁶ .................................................. G09G 5/04
[52] U.S. Cl. ............................ 345/153; 345/22; 348/189
[58] Field of Search ........................ 345/22, 153, 207; 348/184, 185, 189

[56] References Cited

U.S. PATENT DOCUMENTS 4,386,345  5/1983  Narveson et al. .
4,700,218  10/1987  Thomsen et al. ............... 358/29
4,703,345  10/1987  Matsuzaki et al. .............. 358/74

(List continued on next page.)

FOREIGN PATENT DOCUMENTS 0076076  4/1983  European Pat. Off. ........ G09G 1/28
0384879  8/1990  European Pat. Off. ........ G06F 3/033
384879    8/1990  European Pat. Off. ........ G06F 3/033
2169773   1/1986  United Kingdom ............ H04N 9/73
0313795   9/1988  WIPO .......................... H04N 17/02

OTHER PUBLICATIONS

IBM Technical Disclosure Bulletin, vol. 37, No. 01, pp. 287–289, "Dynamic Time–Dependent User Interface Modification", Jan. 1994.

IBM Technical Disclosure Bulletin, vol. 35, No. 3, pp. 267–269, "Light–Controlled Software Products", Aug. 1992.

(List continued on next page.)

*Primary Examiner*—Richard Hjerpe
*Assistant Examiner*—Juliana S. Kim
*Attorney, Agent, or Firm*—Carr & Ferrell LLP

[57] ABSTRACT

A system for correcting an output device for the effects reflected ambient illumination comprises an output device, a calibration memory, a reflectivity memory, a system memory, a processor, an input device, a video card, a color display memory, and a reflection device of known reflectivity. The color display memory stores a first graphical interface and a second graphical interface. The first graphical interface displays a range of intensities of outputs that the display device can generate. The second graphical interface displays a range of hues that the display device can generate. The reflection device defines an aperture. The reflection device is compared to the first graphical interface and the second graphical interface by viewing the interfaces through the aperture. The present invention includes a method for compensating an output device for reflected ambient illumination. The system receives a first input of an intensity of the first graphical interface that appears to match the ambient illumination reflected from the reflection device; the system then receives a second input of a hue of the second graphical interface that appears to match the ambient illumination reflected from the reflection device. The system determines the intensity and hue of the ambient illumination reflected from the output device by matching the intensity and hue of the ambient illumination reflected from the reflection device with the output of the output device. The system then adjusts the outputs of the output device to compensate for the reflected ambient illumination.

2 Claims, 22 Drawing Sheets

U.S. PATENT DOCUMENTS

| | | | |
|---|---|---|---|
| 4,742,387 | 5/1988 | Oshima | 358/29 |
| 4,746,970 | 5/1988 | Hosokawa et al. | 358/29 |
| 4,962,418 | 10/1990 | Kamaga | 358/29 |
| 5,181,103 | 1/1993 | Tatsuya | 358/64 |
| 5,258,828 | 11/1993 | Sano et al. | 358/29 |
| 5,313,291 | 5/1994 | Appel et al. . | |
| 5,483,259 | 1/1996 | Sachs . | |
| 5,512,961 | 4/1996 | Cappels, Sr. . | |

OTHER PUBLICATIONS

Minolta Camera Co., Ltd., Precise Color Communication, 1993.

Sonnetech, Ltd., ColorMatch Slide Presentation, 1993, Slides 1–12, 14, 15.

Sonnetech, Ltd., ColorMatch Promotional Materials, 1993, pp. 1–4.

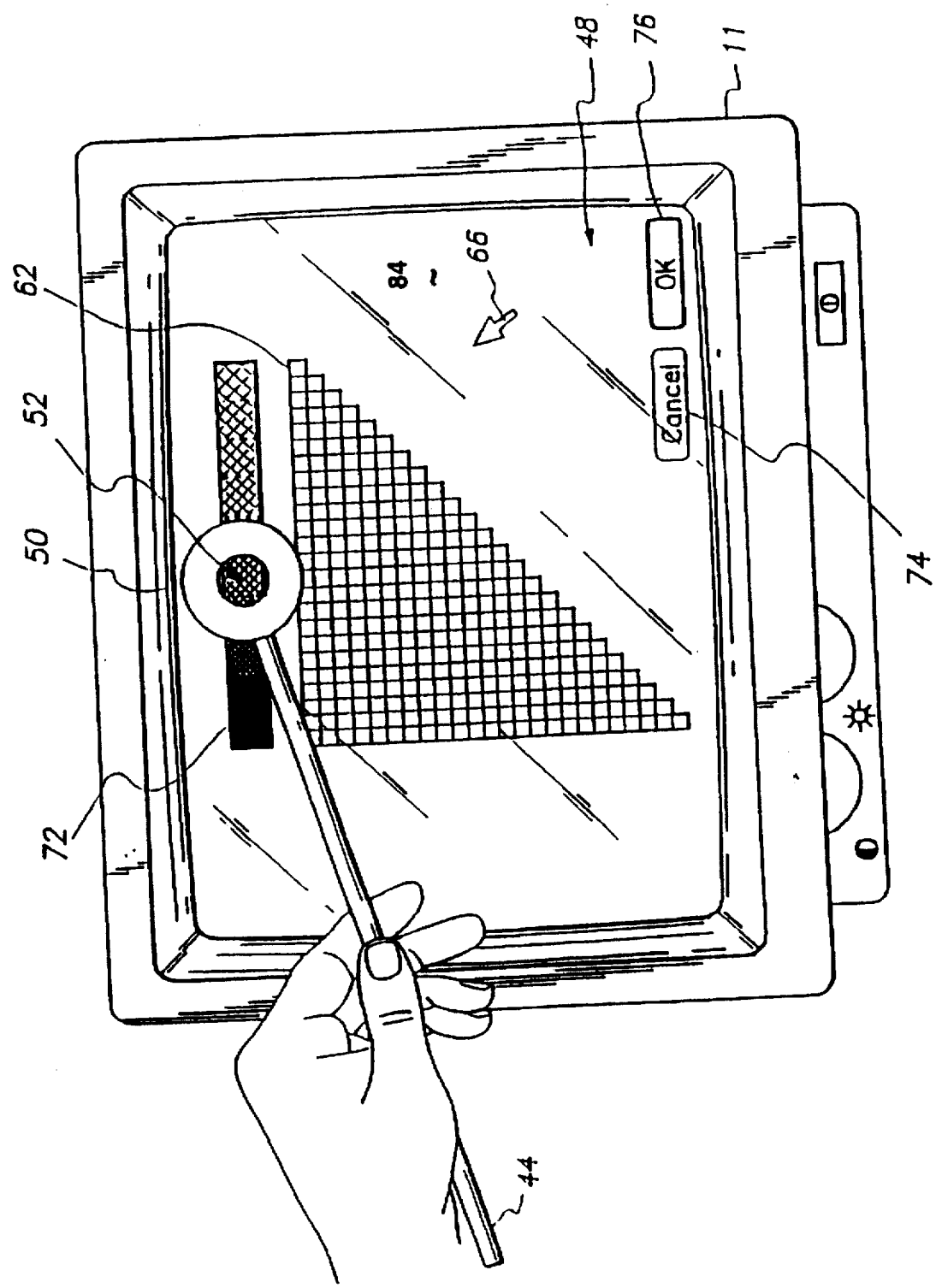

SYSTEM AND METHOD FOR ADJUSTING THE ILLUMINATION CHARACTERISTICS OF AN OUTPUT DEVICE

CROSS-REFERENCE TO RELATED APPLICATIONS

The present application is a continuation-in-part of pending U.S. patent application Ser. No. 08/240,002, filed May 9, 1994, invented by Richard D. Cappels, Sr. and Mathew Hernandez, entitled "A System And Method For Adjusting The Output Of An Output Device To Compensate For Ambient Illumination," which is incorporated herein by reference. The present application also relates to pending U.S. patent application Ser. No. 08/036,349, filed Mar. 24, 1993, invented by Richard D. Cappels, Sr., entitled "Method And System Of Achieving Accurate White Point Setting Of A CRT Display," which is incorporated herein by reference.

BACKGROUND OF THE INVENTION

1. Field of the Invention

This invention relates to computer displays and more particularly to an improved system and method for adjusting the output of a display device to compensate for ambient illumination.

2. Description of the Background Art

As computers have become cheaper and more versatile, people have applied them to an expanding array of applications and tasks. People now use computers in many areas where, until recently, the expense of computers was so great as to prohibit their use. Many of these new applications require the precise display of data on the output device associated with the computer. This need for precision in display includes the accuracy of the color and intensity of the output device. Graphic artists now frequently use computers to create designs. Graphic artists require that output devices precisely display color so that they may observe the final appearance of their creation. Electrical engineers also use computers to layout devices in designs of integrated circuits. In a layout, each circuit is assigned a shape and color and is shown on the output device of the computer. The overlap and interaction of circuits is shown by displaying the circuits in different shades and colors. Subtle shades and differences in color may be relevant to the ultimate validity of a design. Thus, it is imperative that the color and intensity of the output from the display device be accurate.

The ambient illumination in which an output device operates affects the observed output of the output device. The ambient illumination reflects off the glass and inside coatings of the front glass plate of the output device and alters the color and intensity of the output that the user observes. It is therefore necessary to compensate the output of the output device for ambient illumination reflected from the front glass plate.

While color and intensity must be accurately displayed, any means for achieving such accuracy must be inexpensive. The decrease in the cost of computers is partially responsible for their increased use. An expensive system that accurately compensates the output of a display device would be unavailable to many new users of computers because of cost. Such a compensation system would increase the cost of using computers such that the use of computers would once again be impractical.

Several low cost approaches have been taken to compensate accurately the color and intensity of the output of a display device. One system uses differently colored cards depending upon the dominant ambient illumination. These systems use one card if the ambient illumination is primarily incandescent light and another card if the ambient illumination is primarily fluorescent light. There may be other cards for other types of ambient illumination. As the user holds the appropriate card up to the output device, the system generates outputs of different hues and intensities. The user views these outputs through more than one aperture in the card. The system asks the user questions regarding the outputs, comparisons of the outputs to the card, and the comparisons of the outputs to each other. From the responses that the system receives, the system determines the appropriate settings for the output device to compensate for reflected ambient illumination. These systems have several deficiencies and problems. First, these systems use different cards for different types of ambient illumination. Each card is specifically made for a type of ambient illumination. Thus, these systems do not analyze appropriately ambient illumination from more than one type of source. Second, these systems require many inputs from the user. They are difficult to use and require significant time and effort on the part of the user. Finally, these systems determine proper adjustments for ambient illumination at the same time that they determine other settings for the display device. Thus, if the ambient illumination changes, the system must re-calibrate all characteristics of the display device not just the compensation for the ambient illumination.

Current systems that attempt to compensate output devices for ambient illumination are cumbersome and difficult to use. These systems, however, must be used frequently as the ambient illumination may change several times during a use period. A user needs a system that is easy and efficient for the user to provide data necessary for the system. A user will not use a system often enough if it is cumbersome and difficult to use.

Therefore, a system and method is needed to compensate more easily and efficiently the output of a display device to account for ambient illumination.

SUMMARY OF THE INVENTION

The present invention overcomes the limitations and deficiencies of the prior art with a system and method for accurately compensating a display device to adjust for ambient illumination. The system and method of the present invention include a means for the user to provide quickly and efficiently data needed to calibrate the output of the display device. The system comprises an input device, a processor, a memory, a pre-recorded calibration memory, and a reflection device. The pre-recorded calibration memory stores a first graphical interface and a second graphical interface. The memory includes an operating system and compensator.

The first graphical interface comprises a plurality of display regions. Each display region has a neutral hue and displays different intensities so that a range of intensities that the display device is capable of producing is presented. The user then compares the display regions to the ambient illumination reflected from the reflection device. The user selects the display region that appears to match most closely the ambient illumination reflected from the reflection device.

The second graphical interface is a representation of a portion of the CIE 1976 Uniform Color Space that the display device is capable of producing. The second graphical interface is divided into a plurality of squares; each square is assigned a coordinate point in the CIE 1976 Uniform Color Space Diagram and displays the hue of its coordinate point. As with the first graphical interface, the user compares the squares to the ambient illumination reflected from the reflection device. The user selects the square that most closely matches the ambient illumination reflected from the reflection device. The compensator controls the display of the first and second graphical interfaces, analyzes inputs, and calibrates the display device to compensate for ambient illumination reflected from the display device.

The reflection device comprises a flexible handle and a disk portion. The handle is for holding the disk portion tangent to the center point of the front glass plate of the display device. The disk portion defines an aperture. The user views the first and second graphical interfaces through the aperture.

The present invention includes a method for compensating a display device for ambient illumination. The system first calibrates the display device. The system uses the systems and methods described in the co-pending patent applications referenced above to calibrate the display device. Then, the system outputs the first and second graphical interfaces on the display device. The system receives a signal from the user that specifies the display region of the first graphical interface that appears to match most closely the ambient illumination reflected for the reflection device. From this input, the method determines the intensity of the output that appears to match the ambient illumination reflected from the reflection device. Once again, the system receives a signal from the user; this signal indicates the square of the second graphical interface that most closely matches the hue of the ambient illumination reflected from the reflection device. Thus, with one display the method receives the data needed to compensate the output device.

With this data, the method determines the tristimulus values of the ambient illumination and the tristimulus values of the ambient illumination reflected from the front glass plate of the display device. The method uses the systems and methods described in the co-pending patent applications referred to above. The method finally re-calibrates the display device by removing from all outputs of the display device the tristimulus values of the reflected ambient illumination.

BRIEF DESCRIPTION OF THE DRAWINGS

The file of this patent includes at least one drawing executed in color.

FIGS. 9A and 9B are front plan views of the reflection device being used with a display device showing a second embodiment of the first graphical interface and the second graphical interface;

DETAILED DESCRIPTION OF THE PREFERRED EMBODIMENT

Figure 1:
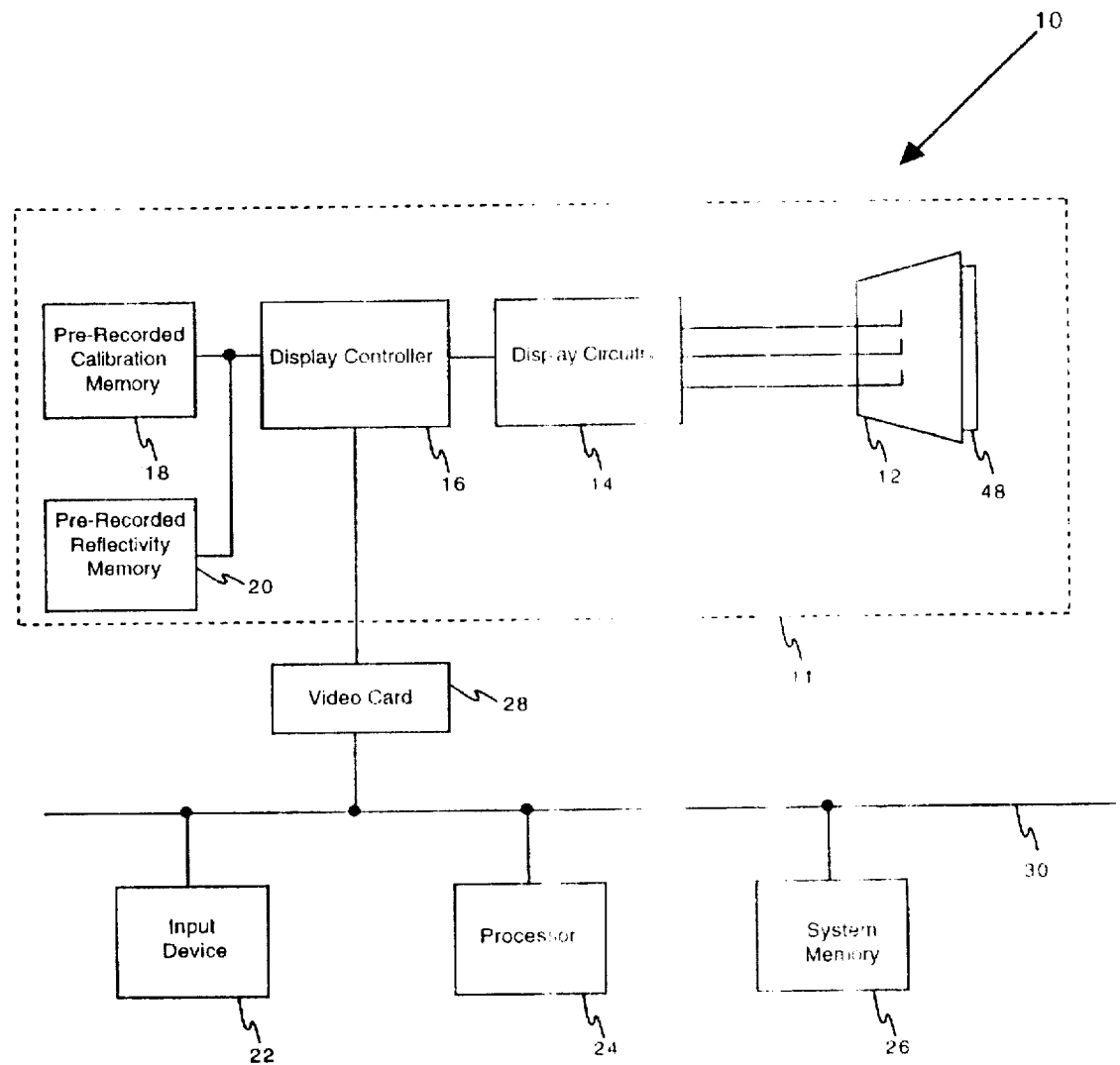
FIG. 1 is a block diagram showing the system of the present invention for adjusting the output of a display device to compensate for ambient illumination.
Figures 5, 6A:
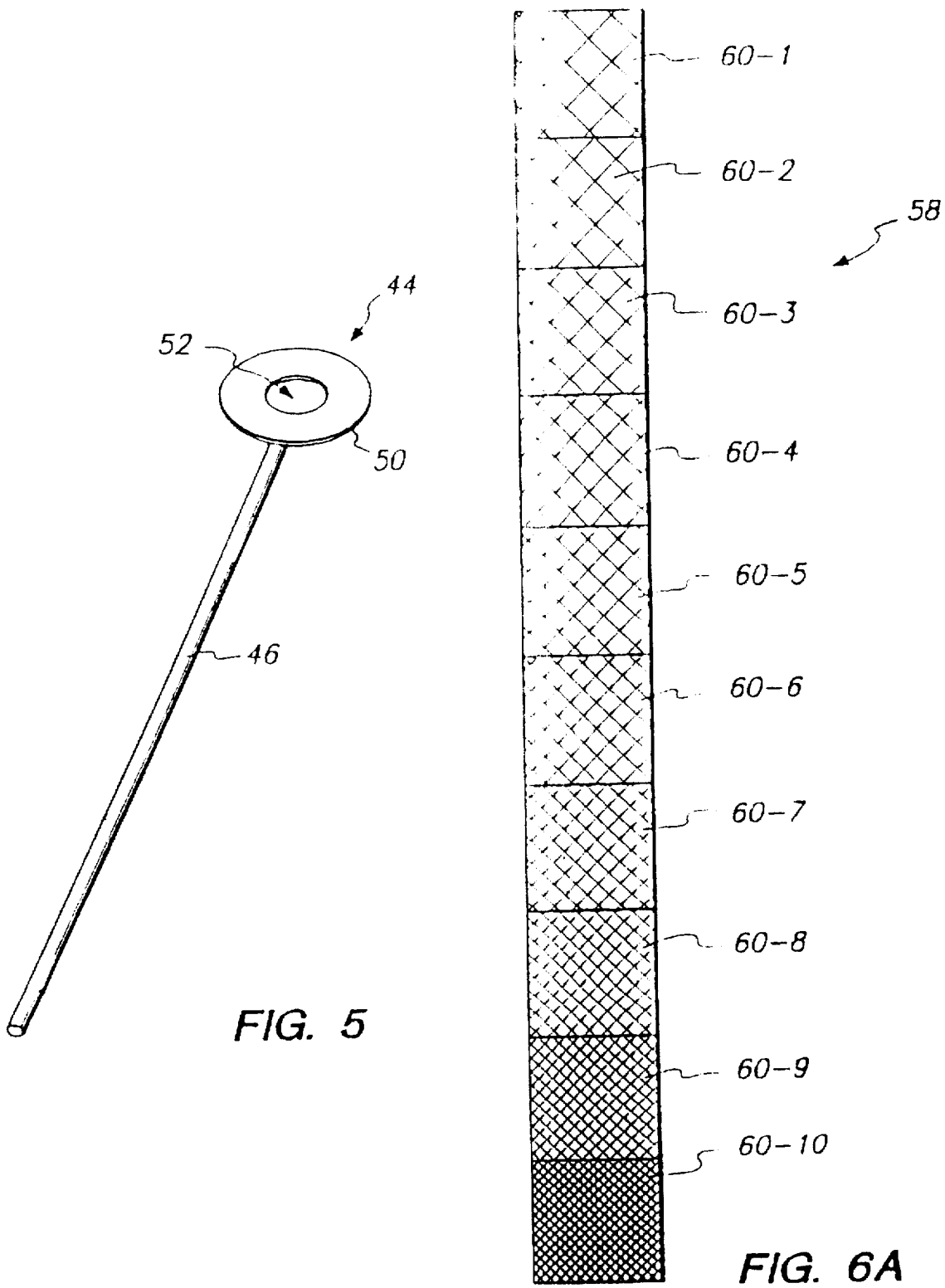
FIG. 5 is perspective view of a first, preferred embodiment of a reflection device of the present invention.
FIGS. 6A and 6B are graphical representations showing a first embodiment of the first graphical interface and a first embodiment of a second graphical interface of the present invention, respectively.

Referring now to FIG. 1, a block diagram of a preferred embodiment of a system 10 for adjusting the illumination characteristics, color and intensity, to compensate for ambient illumination is shown. The system 10 comprises an output device 11, an input device 22, a processor 24, a system memory 26, a video card 28, and a wand 44. The wand 44 is shown in FIG. 5. The output device 11, input device 22, processor 24, memory 26, and video card 28 are coupled together by a bus 30 in a von Neuman architecture. Those skilled in the art will realize that the output device 11, the input device 22, processor 24, system memory 26, and the video card 28 may be coupled together in other architectures without departing from the spirit and scope of the present invention. The system 10 measures the hue and intensity of the ambient illumination and adjusts the output of the output device 11 so that the color and intensity of the output is as accurate as possible.

The input device 22, processor 24, system memory 26, and video card 28 are preferably a Macintosh Computer model Quadra 800 from Apple Computer, Inc. of Cupertino, Calif. Those skilled in the art will realize that other computer systems, such as an I.B.M. compatible personal computer, may be used to implement the present invention.

The output device 11 comprises, a display device 12, display circuitry 14, a display controller 16, a pre-recorded calibration memory 18, and a pre-recorded reflectivity memory 20. The display device 12 is a conventional display device such as a cathode ray tube ("CRT"). While the present invention is discussed with reference to cathode ray tube type display devices. The present invention is fully applicable to all display device technologies including liquid crystal displays and gas discharge displays. Furthermore, the present invention may be used to compensate the output of color printers, color photograph developers, and other such devices to adjust for ambient illumination. The display device 12 includes a front glass plate 48 through which the display device 12 outputs visual data. The front glass plate 48 is typically coated on its inner surface with chemicals which include phosphors. The output comprises a plurality of pixels of light. Each pixel is made up of a red light, a blue light, and a green light. Within a pixel, each color may vary individually in intensity.

The display circuitry 14 is a conventional electronic circuit that drives the output of display device 12. The display circuitry 14 is a set of cathodes and other circuit elements that generate three electron beams. The output signal of the display circuitry 14 comprises three channels, one for each color output by the output device 11. In accordance with standard convention, the channel for the red color is referred to as the R channel; the channel for the green color is referred to as the G channel; and the channel for the blue color is referred to as the B channel. Each electron beam stimulates one of the channels of the colors on the output. The display circuitry 14 has inputs and outputs; the outputs of the display circuitry 14 are coupled to respective channel inputs of the display device 12.

The display controller 16 is a conventional display controller for directing communications between the display circuitry 14 and the other devices. The display controller 16 has inputs and an output. The output of the display controller 16 is coupled to the inputs of the display circuitry 14.

The input device 22 is a conventional keyboard and pointing device, such as a mouse type controller, for inputting data into computer systems. The processor 24 is a conventional microprocessor such as the 680xx Series microprocessor manufactured and sold by Motorola, Inc. of Schaumburg, Ill. The video card 28 is a conventional video card used for processing data signals from a compensator 42, shown in FIG. 3, and from other devices. The video card 28 accepts an input of a digital data signal from the processor 24. The video card 28 formats the data for the size of the display device 12. The video card 28 then converts the input data signal from a digital signal to an analog signal and divides the data signal into the three channels, the R, G, and B channels. The video card 28 has inputs and outputs and is coupled to the bus 30 and to the display controller 16. The video card 28 outputs a video signal for the three channels to the display controller 16.

The pre-recorded reflectivity memory ("PRM") 20 is any non-volatile memory such as a read-only memory ("ROM"), an erasable programmable read-only memory ("EPROM"), or a programmable read-only memory ("PROM"). The PRM 20 stores a reflectivity constant, $K_2$, for the glass and inside coatings of the front glass plate 48 of the display device 12. Reflectivity constant $K_2$ is the percentage of the light reflected from the glass and inside coatings of the front glass plate 48 of the display device 12. Reflectivity constant $K_2$ accounts for diffuse and back surface reflectance and transmission of incident ambient illumination from the glass and inside coatings of the front glass plate 48. $K_2$ is preferably a single value that describes, regardless of wavelength, the reflectivity of all visible light that is incident upon the front glass plate 48. In an alternate embodiment, $K_2$ may be three values $K_{2X}$, $K_{2Y}$, and $K_{2Z}$. Where $K_{2X}$ describes the reflectivity of the X channel, $K_{2Y}$ describes the reflectivity of the Y channel, and $K_{2Z}$ describes the reflectivity of the Z channel from the glass and inside coatings of the front glass plate 48. Those skilled in the art will recognize the X channel, the Y channel, and the Z channel as CIE 1931 tristimulus values. Typically, $K_2$ equals 0.059 for high contrast CRTs. The PRM 20 is coupled to the processor 24 through the display controller 16 and video card 28.

The bus 30 is a conventional bus for transmitting data, address, and command signals. While the bus 30 is described as a single bus, those skilled in the art will realize that the bus 30 comprises a data bus, an address bus, and a control bus.

Figure 2:
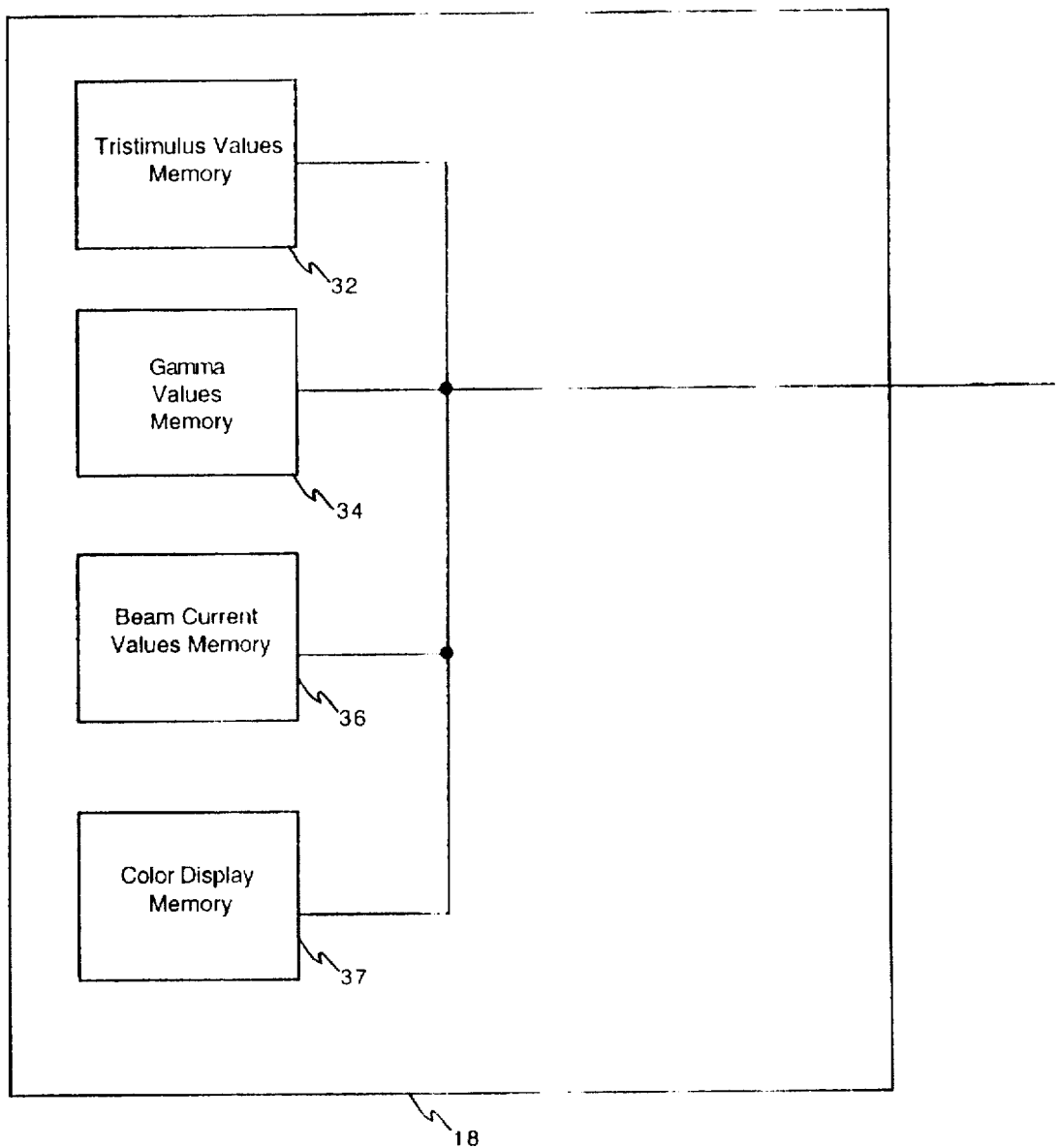
FIG. 2 is a block diagram showing an embodiment of a pre-recorded calibration memory of the present invention.

Referring now to FIG. 2, a block diagram of the pre-recorded calibration memory ("PCM") 18 is shown. The PCM 18 is any non-volatile memory such as a ROM, an EPROM, or a PROM. The PCM 18 shown in FIG. 2 stores calibration data for a CRT. If another display technology is used, other calibration data analogous to, but not identical to, the calibration data for a CRT type display device, would be stored in the PCM 18. The data stored in the PCM 18 is measured and recorded therein at the factory where the output device 11 is manufactured. A calibration memory similar to that described in the pending U.S. patent application Ser. No. 08/036,349, entitled "Method And System Of Achieving Accurate White Point Setting Of A CRT Display," which is incorporated herein by reference, may be used for portions of the PCM 18. As shown in FIG. 2, the PCM 18 preferably comprises a tristimulus values memory 32, a gamma values memory 34, a beam current values memory 36, and a color display memory 37.

The tristimulus values memory 32 stores nine tristimulus values for the output device 11. The output of the output device 11 is given by the equations:

$$X_C = (I_R \, x_R) + (I_G \, x_G) + (I_B \, x_B) \qquad (1)$$

$$Y_C = (I_R \, y_R) + (I_G \, y_G) + (I_B \, y_B) \qquad (2)$$

$$Z_C = (I_R \, z_R) + (I_G \, z_G) + (I_B \, z_B) \qquad (3)$$

Where $X_C$, $Y_C$, and $Z_C$ are the tristimulus values of the outputs of the output device 11; $I_R$, $I_G$, and $I_B$ are the magnitudes electron beams generated by the display circuitry 14; and $x_R$, $x_G$, $x_B$, $y_R$, $y_G$, $y_B$, $z_R$, $z_G$, and $z_B$ are the nine tristimulus values of the output device 11. The tristimulus values are measured at the factory where the output device 11 is constructed.

The gamma values memory 34 stores three gamma value tables, one for each electron beam. A gamma value table maps the relationship between the voltage on a cathode of the display circuitry 14 and the electron beam generated by that cathode. The beam currents are often exponential with respect to the voltage on the cathode. The exponent that describes the relationship between the voltage on the cathode and the electron beam is the gamma value of the cathode. The gamma tables are measured at the factory where the output device 11 is manufactured and are stored in the gamma values memory 34.

The beam current values memory 36 stores reference values for each of the electron beams. The reference values are a baseline white point for the output device 11. The beam current values serve as the initial point, or bias, to which the output device 11 is calibrated.

Figure 6B:
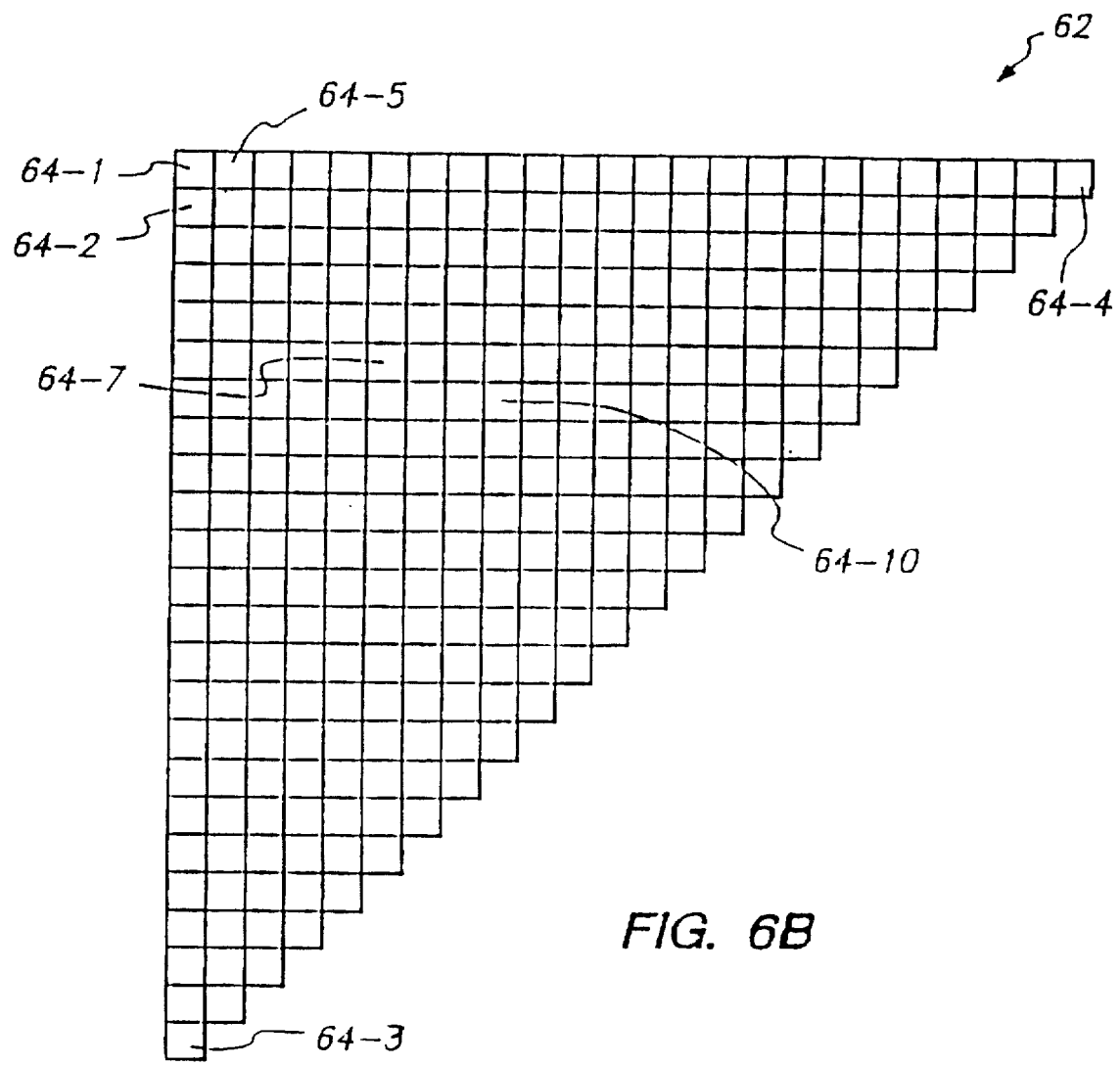

The PCM 18 also includes a color display memory 37. The color display memory 37 stores data arrays that define graphical interfaces. The processor 24, when executing the program instruction steps stored in compensator 42, uses the data arrays to display two graphical interfaces. A first graphical interface 72, shown in FIG. 6A, displays the range of intensities the display device 12 is capable of producing and is used for determining the intensity of the reflected ambient illumination. A second graphical interface 62, shown in FIG. 6B, represents a portion of the CIE 1976 UCS Diagram which describes the hues that the output device 11 is capable to producing. The second graphical interface 62 is used for determining the hue of the reflected ambient illumination. Alternatively, the color display memory 37 may be a part of the system memory 26.

Figure 3:
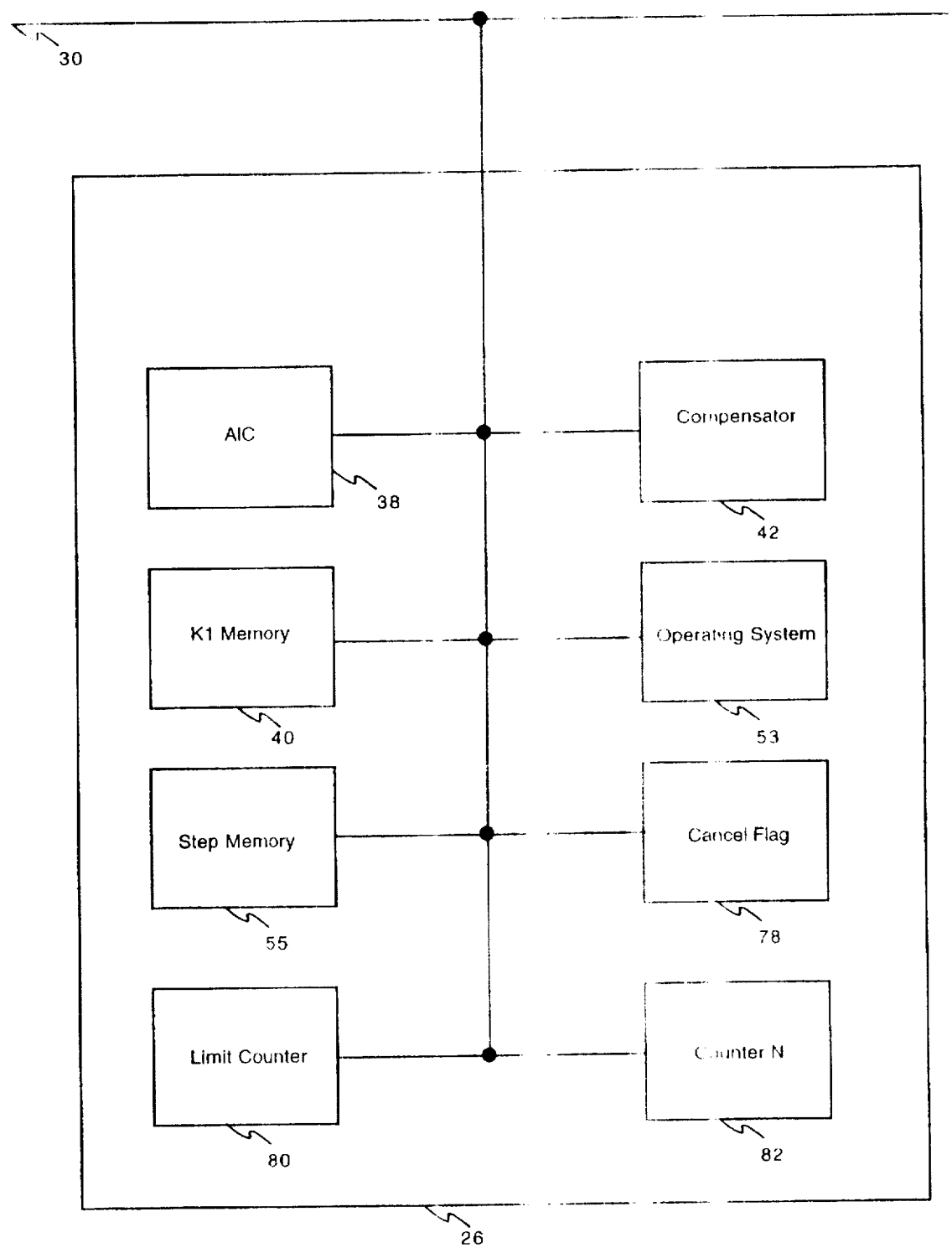
FIG. 3 is a block diagram showing an embodiment of the system memory of the present invention.

Referring now to FIG. 3, a block diagram of an embodiment of the system memory 26 is shown. The system memory 26 is a conventional, dynamic random access memory. While the components of the system memory 26 will now be discussed as separate memories, those skilled in the art will realize that the system memory 26 may be a single, dynamic random access memory with various addresses or portions of the memory storing the data or programs that form each component. The system memory 26 comprises an ambient illumination compensated beam current memory ("AIC") 38, a $K_1$ memory 40, a compensator 42, an operating system 53, a step memory 55, a cancel flag 78, a limit counter 80, and a counter N 82. In an alternate embodiment, the system memory 26 may also include the color display memory 37. The AIC 38 stores data that is determined by the compensator 42. The compensator 42 determines the proper adjustment for the output device 11 to compensate for ambient illumination and stores the adjustment values in the AIC 38.

Figure 7:
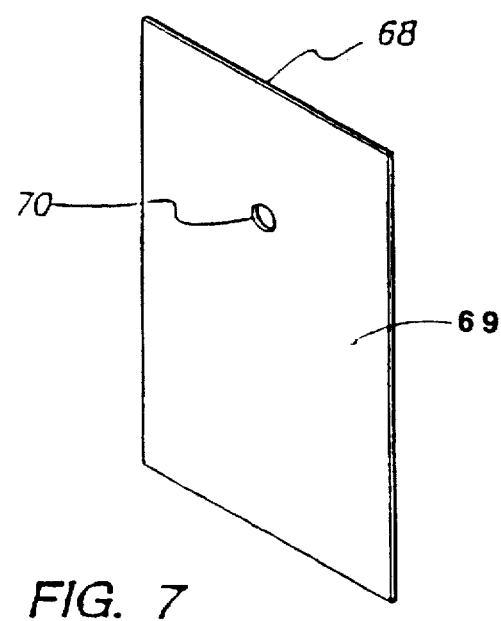
FIG. 7 is a perspective view of a second embodiment of the reflection device of the present invention.

The $K_1$ memory 40 stores the reflectivity constant, $K_1$, of a disk portion of the wand 44. A first embodiment of a reflection device is shown in FIG. 5, and a second embodiment of a reflection device is shown in FIG. 7. The reflection device serves as a standard to which the output of the output device 11 is compared when the system 10 is calculating the proper adjustment to compensate for ambient illumination. The compensator 42 determines the amount of ambient illumination reflected from the glass and inside coatings of the front glass plate 48 using the output of the display device 12, the reflectivity constant, $K_2$, of the glass and inside coatings of the front glass plate 48, and the reflectivity constant, $K_1$, of a reflection device. The reflectivity constant $K_1$ is typically 0.42. In the preferred embodiment, $K_1$ is constant for all wavelengths of visible light. Similar to $K_2$, in an alternate embodiment $K_1$ may have three components, $K_1x$, $K_1y$, and $K_1z$.

The compensator 42 receives data from the operating system 53, the $K_1$ memory 40 the AIC 38, the PCM 18, and the PRM 20 and compensates the output of the output device 11 for reflected ambient illumination. The compensator 42 is preferably a set of program instruction steps that when executed by the processor 24 specify the calculations that are made, the graphical interfaces that are used to communicate with the user, and the flow of data in the system 10. When the compensator 42 is said to take an action, in actuality the processor 24 executes program instruction steps of the compensator 42 to perform the required action. The compensator 42 also temporarily stores data, such as the brightness of the ambient illumination, while compensating the output device 11. The compensator 42 preferably first determines the intensity and then the hue of an output that when viewed by the user appears to match the ambient illumination reflected from the wand 44. While the compensator 42 is calculating hue, the compensator 42 temporarily stores the intensity values.

The system memory 26 also includes a limit counter 80, a counter N 82. The limit counter 80 and counter N 82 are conventional counters used by the compensator 42 to record the number of times an action is executed. In an alternate embodiment, the limit counter 80 and counter N 82 are data registers which the compensator 42 increments to record a count. The system memory 26 also includes a cancel flag 78. The cancel flag 78 is a conventional flag that is used to indicate that a user has instructed the system 10 to cease the process of adjusting the output of the output device 11 to compensate for ambient illumination. Those skilled in the art will realize that the cancel flag 78 may be a register or memory location.

The operating system 53 controls inputs and outputs of data to the system 10 through the input device 22 and the output device 11. The operating system is preferably the System 7.1 operating system from Apple Computer, Inc. of Cupertino, Calif. The operating system includes a means to coordinate and interpret input data points from the pointing device of the input device 22. Thus, a user may select data or commands, displayed on the output device 11, by manipulating the pointing device to move a displayed cursor on a screen of the display device 12. Once the user has positioned the cursor, the user "clicks" the pointing device to generate an input. The operating system 53 identifies the selected data or command by comparing the coordinates input from the mouse to a record, contained within the memory 24, of the current display on the display device 12. Alternately, the operating system 53 may supply, to the compensator 42, only the coordinates of the location of the cursor on the display device 12 when the user "clicked" the pointing device. The compensator 42 then compares the coordinates from the operating system 53 to the graphical interface the compensator 42 is currently displaying on the display device 12. From the results of this comparison, the compensator 42 determines the command or data selected. The operating system may alternately be MS-DOS and Windows from Microsoft Corporation or any processor based operating system.

The step memory 55 stores a data value that indicates the difference in either intensity or hue of different parts of the first graphical interface 58 or the second graphical interface 62, respectively. The data that the step memory 55 stores will be explained in greater detail with reference to FIG. 13. In the preferred embodiment, the system memory 26 includes the AIC 38, $K_1$, memory 40, compensator 42, and operating system 53, and does not include the step memory 55, cancel flag 78, limit counter 80, or counter N 82.

Figure 4:
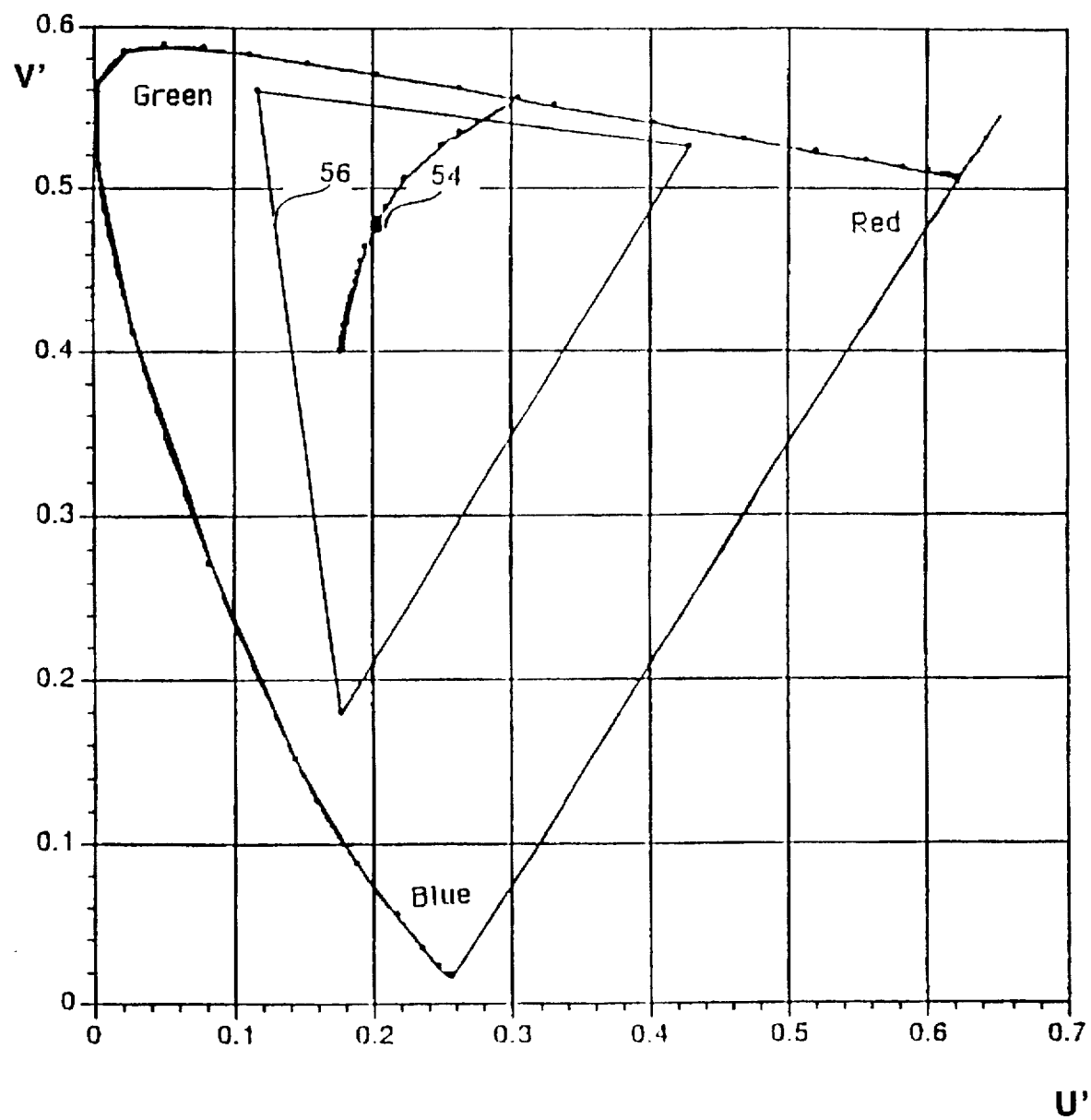
FIG. 4 is a graphical representation of the CIE 1976 UCS Model of human perception of color used by the present invention.

Referring now to FIG. 4, a graphical representation of the CIE 1976 Uniform Color Space (hereinafter the "CIE Space") is shown. According to the CIE 1976 UCS model, all colors of light, which are perceptible to the human eye, may be made by combining within a pixel points of red, green, and blue light of different intensities. Each pixel is made up of a point of red light, a point of green light, and a point of blue light. The R, G, and B channels describe the red, green, and blue outputs, respectively. The ratios of the R, G, and B channels to each other are the color value of the pixel. When a region of the display device 12 is set to display a white point, the channels of all the pixels of that region are set in the ratios, to each other, for white light. In addition to the color value, each pixel has a brightness level. The brightness is a baseline value of the intensity of the pixel, and in turn of the channels. To modify the brightness of a pixel, the three channels are modified by a constant so that the ratios among the three channels are unmodified. That is, all three channels are multiplied by a constant. The color value together with the brightness level is the tristimulus values of the output. R, G, B channel values are used for describing the output of the display circuitry 14. X, Y, Z are used for describing coordinates within color spaces and are converted to R, G, B values by the video card 28. In the CIE 1976 Color Space, coordinator of u', v' are used to describe points within the space. Coordinates u', v' are fully convertible into X, Y, Z coordinates. These skilled in the art will recognize u', v' and will recognize the equivalence between X, Y, Z coordinates and u', v' coordinates.

The CIE Space shown in FIG. 4 represents the boundary of color perceptible to the human eye. Near the point labeled red, the color is red. Near the point labeled green, the color is green. Near the point labeled blue, the color is blue. At a white point near the middle of the CIE Space, the combination of red, green, and blue is observed as white light. This white point is shown in FIG. 4 by a dot 54; hereinafter the dot 54 is referred to as the white point 54. The present invention adjusts the output of the output device 11 to output accurate color. The compensator 42 determines the amount of red, green, and blue light that describes the ambient illumination that is reflected from the glass and inside coatings of the front face plate 48. The compensator 42 then removes these amounts from the output device 11 in order to compensate the output for the reflected ambient illumination.

Current output devices are not be able to generate all colors within the CIE 1976 UCS Model of human color perception. The present invention can, however, analyze all colors within the CIE 1976 UCS Model of human color perception. Thus, the present invention may be utilized with conventional output devices and with all advances in output device technology.

FIG. 4 includes a triangle 56 that defines a region of the CIE Space. The triangle 56 defines the possible useful outputs of an exemplary output device 11, such as an Apple 13" RGB with 24 bit video display card from Apple Computer, Inc. The exemplary output device 11 is capable of producing color outputs contained within the triangle 56. The output device 11 is capable of producing outputs outside the triangle 56; however, generating such outputs would limit the range of other outputs that the output device 11 could generate. Thus, the triangle 56 includes the greatest continuous range of outputs that the output device 11 can generate. When adjusting the output device 11, the present invention preferably displays a range of possible color outputs, that the output device 11 is capable of producing, to a user at the same time. The user may then select the point that matches the ambient illumination reflected from the wand 44. Thus, the exemplary output device 11 will display the colors of the region defined by the triangle 56 in a graphical interface on the screen of the display device 12. For every output device 11 there is a corresponding polygon which bounds the region of the CIE Space which that output device 11 is capable of useful outputs.

Referring now to FIG. 5, a perspective of a first, preferred embodiment of the wand 44 is shown. The wand 44 comprises a handle 46 and a disk portion 50. The handle 46 is preferably a neutral, gray color or is clear so that the color of the handle 46 does not interfere with the observation of the output of the output device 11. Furthermore, the handle 46 is preferably flexible so that the disk portion 50 may be held against the front glass plate 48. The disk portion 50 is a flat, circular disk. The disk portion 50 preferably has negligible thickness so that it may be held as close as possible to a position in the plane tangent to the center point of the front glass plate 48 of the display device 12. The disk portion 50 has a surface that is achromatic and spectrally flat. Alternatively, the disk portion 50 may not be spectrally flat. In this alternate case, $K_1$ would be 3 values, as were described with reference to FIGS. 1 and 3. The disk portion 50 defines an aperture 52. The aperture 52 preferably has a diameter of 2 degrees or less, and the disk portion 50 has a total diameter of 6 degrees or less. Measurements in degrees represent degrees of a user's field of view when sitting about 50 cm from the output device 11. Two degrees are approximately equal to 1.75 centimeters.

Referring now to FIG. 7, a perspective view of a second embodiment of a reflection device 68 is shown. The reflection device 68 is a card. The card 68 defines an aperture 70. The card 68 preferably has negligible thickness so that it may be held as close as possible to a position in the plane tangent to the center point of the front glass plate 48 of the display device 12. The card 68 has a surface that is achromatic and spectrally flat. Alternatively, the card 68 may not be spectrally flat. In this alternate case, $K_1$ would be 3 values, as were described with reference to FIGS. 1 and 3. The aperture 70 has a diameter of 2 degrees or less. Measurements in degrees are defined as degrees of a user's field of view when sitting 50 cm from the output device 11. Two degrees are approximately equal to 1.75 centimeters.

The card 68 is preferably made of a flexible material so that a bend may be made in the card 68 with the card 68 remaining undamaged. The user holds the card 68 so that a first portion of the card 68 that defines the aperture 70 is adjacent to the front glass plate 48. The user may bend a second portion of the card 68, which does not define the aperture 70 out, away from the first glass plate 48 in order to hold the first portion against the front glass plate 48. The user then views the graphical interfaces through the aperture 70.

Referring now to FIG. 6A, a graphical representation of a first embodiment of a first graphical interface 58 is shown. The present invention assists a user to supply quickly and easily the information needed by the system 10 to compensate the output device 11 for ambient illumination. The present invention uses the graphical interfaces stored in the color display memory 37 to provide the user with a means to select quickly, efficiently, and accurately the illuminance that appears to match the ambient illumination reflected from the wand 44.

The first graphical interface 58 is displayed by the compensator 42 when adjusting the intensity of the output of the output device 11 and is stored in the color display memory 37. This exemplary embodiment of the first graphical interface 58 comprises 10 display regions 60-1 to 60-10. Each display region 60-1 to 60-10 has dimensions of about 2 degrees square at a viewing distance of 50 cm. Thus, each display region 60-1 to 60-10 measures approximately 1.75 cm by 1.75 cm. Each display region 60-1 to 60-10 displays a different intensity. The intensity of the display regions 60-1 to 60-10 initially are separated by 10% of the range of intensity available from the display device 12. Display region 60-1 is the most intense, having an intensity of 100% of the full range of intensity of the display device 12, and display region 60-10 is the least intense having an intensity of 10% of the full range of intensity of the display device 12. Furthermore, as each display region 60-1 to 60-10 is initially separated by a step of 10% of the full range of intensity, display region 60-2 displays 20% of the full range of intensity, display region 60-3 displays 30% of the full range of intensity, and so forth.

Referring now to FIG. 6B, a graphical representation of a second graphical interface 62 is shown. This exemplary, second graphical interface 62 is for the exemplary, 13" RGB with 24-bit card output device 11 and represents that portion of the CIE space included within the triangle 56 as shown in FIG. 4. The data, which the compensator 42 uses to generate the second graphical interface 62, is stored in the color display memory 37. This exemplary, second graphical interface 62 comprises 300 squares. The user holds the wand 44 in the plane tangent to the center point of the front glass plate 48 and views the second graphical interface through an aperture 52 in the wand 44. The aperture 52 must be small enough, or conversely each square must be large enough, so that a single square substantially fills the aperture 52. Each square preferably has dimensions of 10 pixels by 10 pixels or less. The physical dimensions of a square depend on the size of the display device 12. Each square is preferably larger than the aperture 52 of the wand 44. In the preferred embodiment, the second graphical interface is based on a square 30 by 30 squares that is bisected diagonally and comprises approximately 450 squares.

Each square of the second graphical interface 62 is assigned a coordinate point in the CIE Space and displays the hue of that coordinate point. There is preferably a step of a fixed percentage between adjacent squares. Generally the fixed percentage is 100 divided by the number of squares in the longest row. Thus, there is a change in the v' coordinate of the same fixed percentage, of the entire distance from square 64-1 to square 64-3, between squares 64-1 and 64-2. Similarly, there is a fixed percentage, of the entire distance between square 64-1 and square 64-4, change in the u' coordinate between square 64-1 and square 64-5. In another embodiment, such as the preferred embodiment, of the second graphical interface there is a 3.3% step between the assigned coordinates of adjacent squares. Initially, square 64-1 has u', v' coordinates of 0.183, 0.540, square 64-3 has u', v' coordinates of 0.183 and 0.427, and square 64-4 has u', v' coordinates of 0.310 and 0.540. Note that these values are initial values, and in the preferred embodiment are constant. The white point has u', v' coordinates of 0.188, 0.446.

Figure 8A:
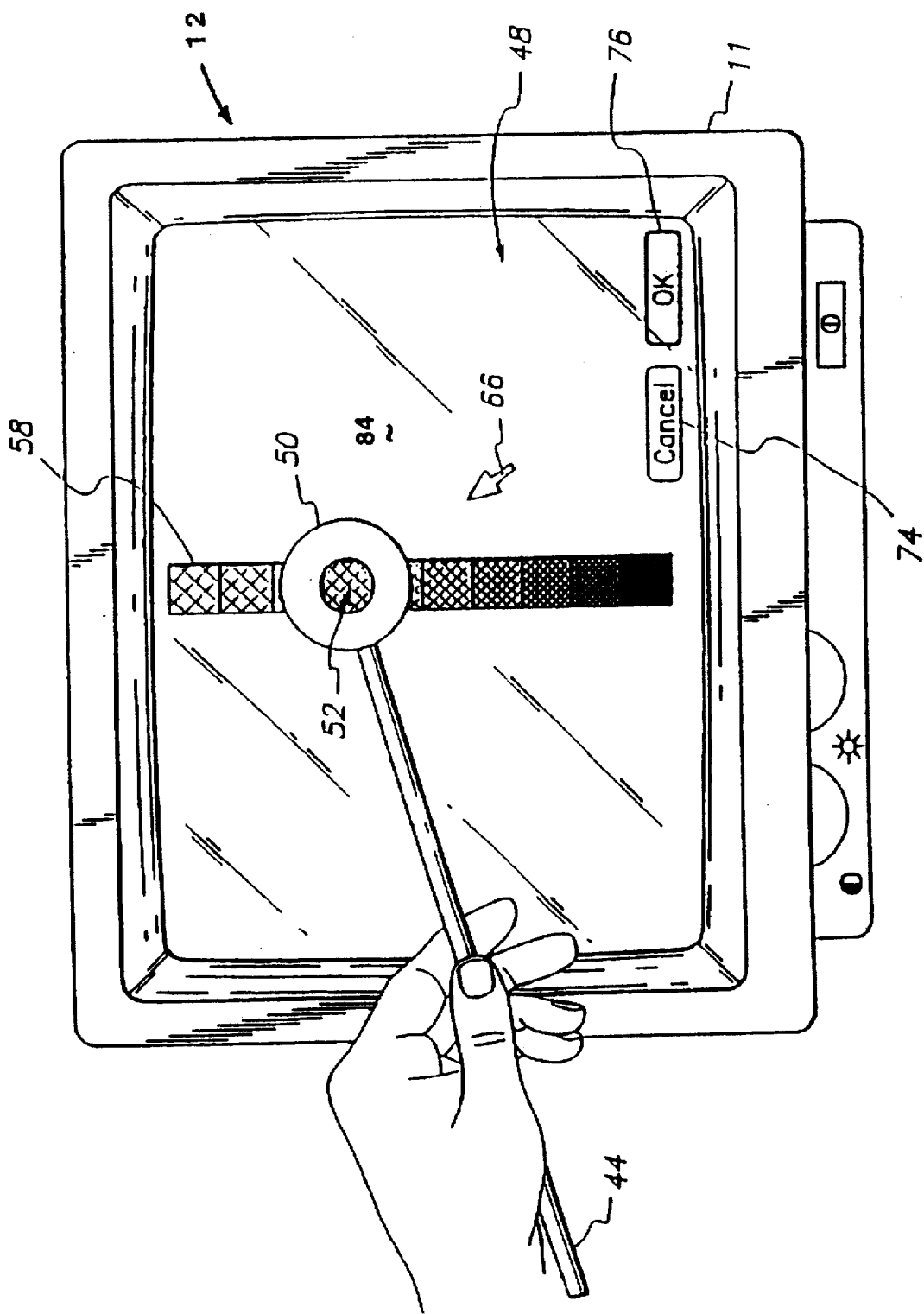
FIGS. 8A and 8B are front plan views of the reflection device being used with a display device showing the first embodiment of the first graphical interface and the first embodiment of the second graphical interface, respectively.

Referring now to FIG. 8A, a front plan view of the output device 11, when the compensator 42 is adjusting the intensity of the output of the display device 12, using the first graphical interface 58, is shown. FIG. 8A also shows the wand 44 being held in a position that is in the plane that is tangent to the center point (not shown) of the front glass plate 48. The compensator 42 displays the ten display regions 60-1 to 60-10 of the first graphical interface 58 described above with reference to FIG. 6A. The user compares the ten display regions 60-1 to 60-10 to the wand 44 and selects the display region 60-1 to 60-10 that is closest to the brightness of the wand 44. While adjusting the intensity of the output, the compensator 42 holds the background field 84, displayed behind the first graphical interface 58 on the display device 12, at a neutral, gray color and a low-level intensity.

The user compares the display regions 60-1 to 60-10 to the ambient illumination reflected from the wand 44 by viewing the display regions 60-1 to 60-10 through the aperture 52 defined by the disk portion 50. Similarly, the user may view the display regions 60-1 to 60-10 through the aperture 70 of the card 68. The user then selects the display region 60-1 to 60-10 that most closely matches the ambient illumination reflected from the disk portion 50 of the wand 44. The user selects a display region 60-1 to 60-10 by positioning a cursor 66 on the selected display region 60-1 to 60-10 using the pointing device of the input device 22. The user then indicates the selection by "clicking" the pointing device. The operating system 53 determines the coordinates of the cursor 66 and supplies the coordinates to the compensator 42. The compensator 42 then determines the display region 60-1 to 60-10 selected. The compensator 42 reduces the step between display regions 60-1 to 60-10, reduces the range of intensity displayed by a pre-determined percentage, assigns the selected intensity to display region 60-5, assigns intensities to each of the remaining display regions 60-1 to 60-10, and allows the user to select again the display regions 60-1 to 60-10 that most closely matches the reflection device 44. In this way, the user may refine the selection of the matching intensity.

FIG. 8A shows a cancel button 74 and an OK button 76. The cancel button 74 and the OK button 76 are graphical interfaces generated by the operating system 53. The user can end the process of adjusting by selecting either the cancel button 74 or the OK button 76. The user selects the cancel button 74 or the OK button 76 by positioning the cursor on the desired button and "clicking" the pointing device. If the user select the cancel button 74, the process of adjusting the output device 11 for ambient illumination ends with no adjustment taking place. Should the user select the OK button 76, the compensator 42 re-calibrates output device 11 using the current output to calculate the ambient illumination. The user may select the cancel button 74 or the OK button 76 at any time.

Figure 8B:
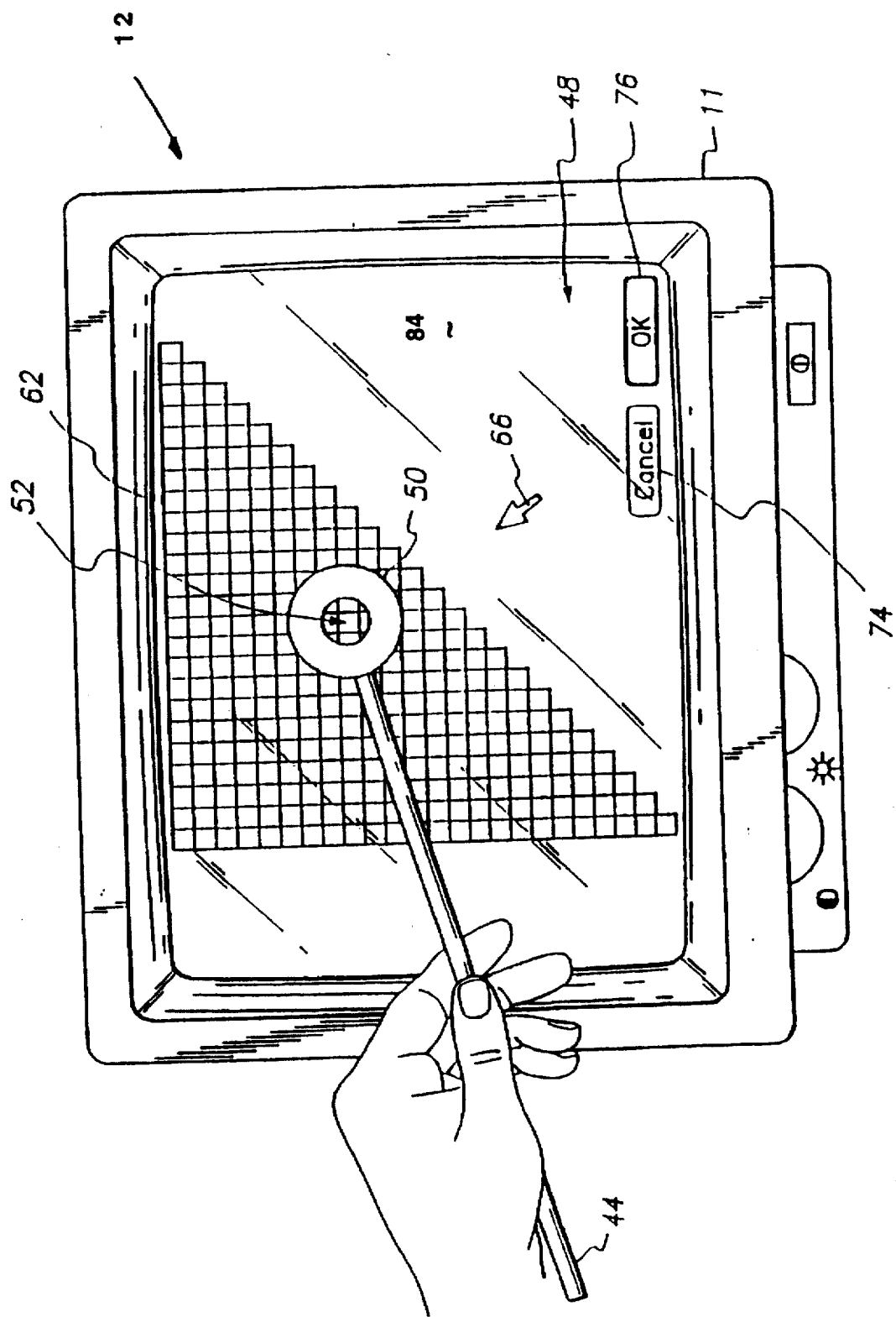

Referring now to FIG. 8B, a front plan view of the output device 11, when the compensator 42 is displaying the second graphical interface 62 on the display device 12, is shown. FIG. 8B also shows the wand 44 being held in the plane that is tangent to the center point (not shown) of the front glass plate 48 of the display device 12.

In a manner similar to that used for the intensity, a user compares the hue of the ambient illumination reflected from the disk portion 50 of the wand 44 to the output of the output device 11. The user makes the comparison by viewing the output through the aperture 52. The user positions the wand 44 so that the aperture 52 appears to disappear. (i.e., The hue of the square appearing through the aperture 52 matches the hue of the ambient illumination reflected from the disk portion 50 so that there does not appear to be an aperture 52 in the wand 44.) Similarly, the user may position the card 68 so that the aperture 70 appears to disappear. The user then selects the square, which most closely matches the wand 44, by positioning the cursor 66 so that it may be seen through the aperture 52. The user positions the cursor by means of the pointing device of the input device 22. The user then "clicks" the pointing device to select the square. The operating system 53, receives an input from the input device 22 and determines the coordinates of where on the second graphical interface 62 the user selected a square. The operating system 53 provides these coordinates to the compensator 42, and the compensator 42 then determines the identity of the selected square.

Once a square is selected, the compensator 42 assigns the u', v' coordinates in the CIE Space of the selected square to a center square 64-10 and reduces the step between the squares by one quarter. Thus, approximately one quarter of the color range is eliminated, and the user can refine the selection. Each square is then assigned a hue based upon the reduced step, its distance for the square 64-10, and the direction in which it lies from the square 64-10. In this way, the compensator 42 reduces the region of the CIE Space that is displayed. The compensator 42, however, has not reduced the total area of the second graphical interface 62. Thus, the compensator 42 increases the resolution between squares and allows the user to refine the selection of the hue that appears to match most closely the ambient illumination reflected from the wand 44.

Referring now to FIG. 9A, a front plan view of the output device 11, when the compensator 42 is simultaneously displaying the second graphical interface 62 and a second embodiment of a first graphical interface 72. The compensator 42 preferably displays both the first graphical interface 72 and the second graphical interface 62 at the same time on the display device 11 when adjusting the output of the display device 11. In this way the system 10 aids the user to provide the data necessary to compensate the output device 11 for ambient illumination. By displaying both the first graphical interface 72 and the second graphical interface 62, the compensator 42 provides to the user examples of the outputs that the output device 11 is capable of producing. The first graphical interface 72 and second graphical interface 62 provide an environment so that the system 10 can quickly and easily receive data from the user and provide a more efficient means for the user to compensate the output device 12. This aids the user in efficiently producing accurate work with a computer system.

The compensator 42 preferably displays the first graphical interface 72 horizontally across the display device 11. The first graphical interface 72, when displayed on the exemplary output device 11, the Apple 13" RGB with 24 bit video display card, comprises 256 display regions. The first graphical interface 72 preferably comprises the maximum number of display regions that the output device 11 is capable of generating. The exemplary output device 11 with 24 bit video display card uses 8 bits for intensity and thus, is capable of producing 256, or $2^8$ display regions. Other output devices may produce a different number of display regions in the first graphical interface 72. For example, a second exemplary output device 11 with 4 bit card, which uses 4 bits for intensity, would produce a first graphical interface 72 having 16, or $2^4$, display regions.

Each display region preferably has a height of 25–30 pixels and has a minimum height of 10 pixels. The first graphical interface 72 is preferably 300 pixels wide. Thus, each display region is preferably 1 or 2 pixels wide. The compensator 42 arranges the display regions side by side through the first graphical interface 72. The compensator 42 assigns intensities to each of the display regions in a linear manner. A first display region, on the far left of the first graphical interface 72, has the lowest intensity that the output device 11 is capable of producing. A second display region, on the far right of the first graphical interface 72, has the greatest intensity that the output device 11 is capable of producing. The compensator 42 assigns intensities to each of the display regions between the first display region and the second display region so that the distribution of intensities appears to be linear. Thus, there appears to be a continuous range of intensity that the output device 11 is capable of producing between adjacent display regions. Because the display regions are not very wide, the first graphical interface 72 may appear as a gradient from the lowest intensity to the greatest intensity that the display device 12 is able to produce.

FIG. 9A also shows the wand 44 being held in the plane tangent to the center point (not shown) of the front glass plate 48. The wand 44 is being held so that the user may view the first graphical interface 72 through the aperture 52.

Figure 9B:
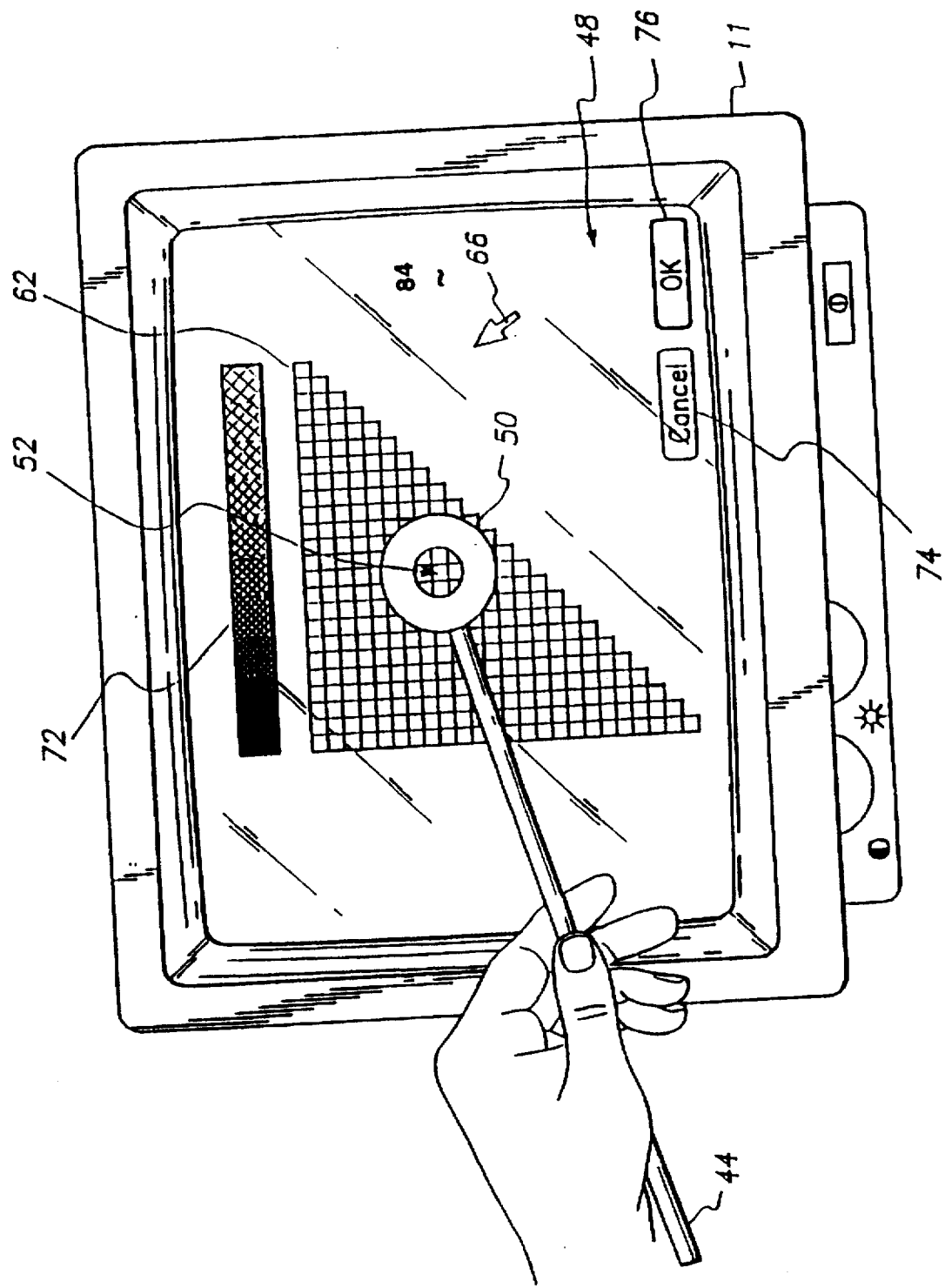

Referring now to FIG. 9B, a front plan view of the output device 11 displaying the first graphical interface 72 and the second graphical interface 62 is shown. FIG. 9B also shows the wand 44 being held in the plane tangent to the center point (not shown) of the front glass plate 48. The wand 44 is being held so that the user can view the second graphical interface 62 through the aperture 52.

Figure 10:
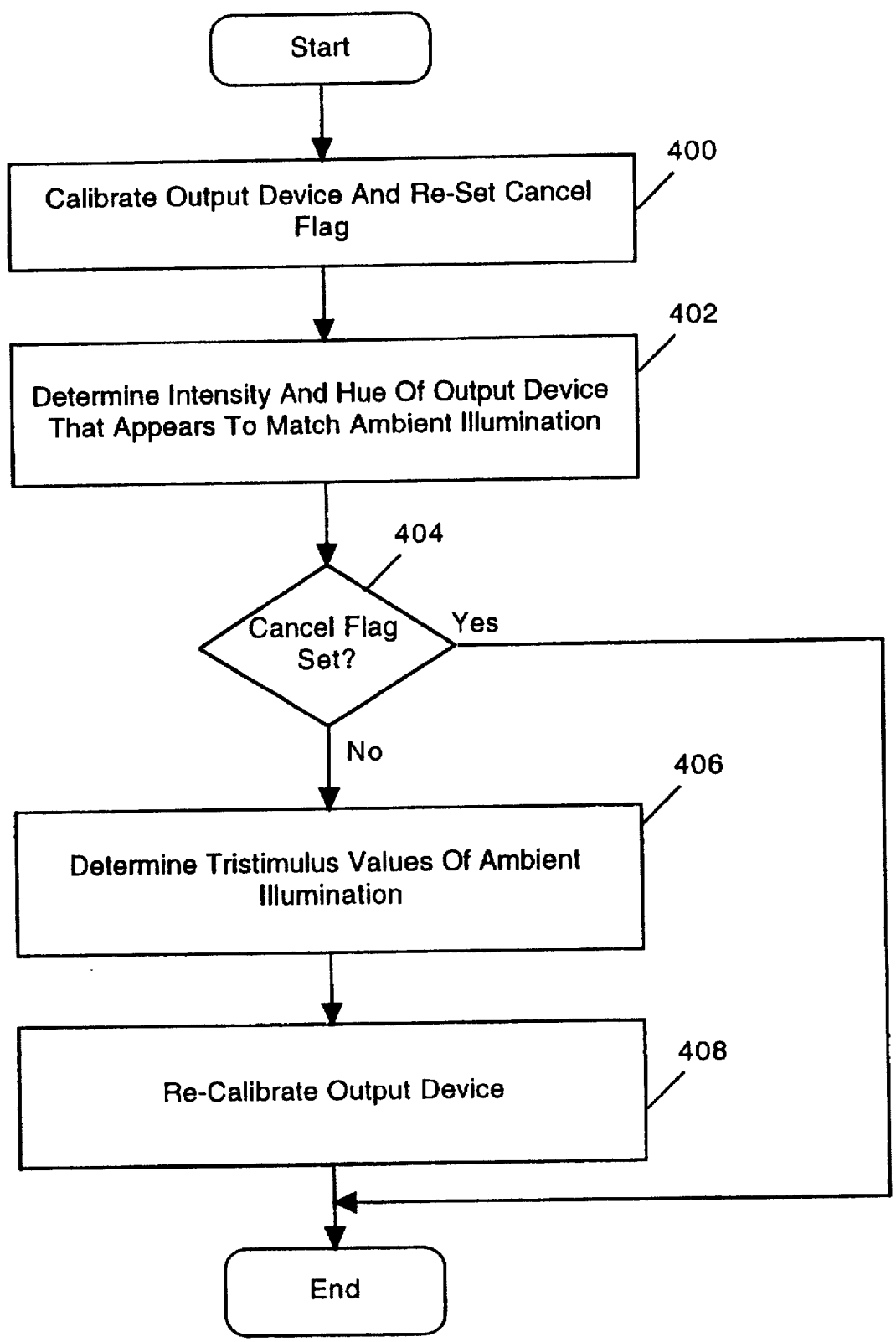
FIG. 10 is a flow chart showing the preferred method for compensating a display device for ambient illumination.

Referring now to FIG. 10, a flow chart of a preferred method for compensating an output device 11 for reflected ambient illumination is shown. The method begins in step 400 where the compensator 42 calibrates the output device 11 and the re-sets the cancel flag 78. The compensator 42 preferably uses the method and system described in pending U.S. patent application Ser. No. 08/036,349 to calibrate the output device 11. The system 10 then determines, in step 402, an output intensity and a hue that appear to match the intensity and hue of the ambient illumination reflected from the wand 44. The method by which the compensator 42 determines the intensity and hue will be described below with reference to FIG. 11.

After the compensator 42 has determined the intensity and hue of an output that appears to match ambient illumination reflected from a reflection device, the compensator 42 determines, in step 404, if the cancel flag 78 is set. The cancel flag 78 may be set while the compensator 42 is determining an intensity and hue that appear to match ambient illumination reflected from a reflection device. If the cancel flag 78 is set, the method ends without adjusting output device 11. If the cancel flag 78 is not set, the method continues in step 406, where the compensator 42 determines the tristimulus values of the ambient illumination reflected from the front glass plate 48 of the display device 12. Finally, in step 408, the compensator 42 re-calibrates the output device 11 to compensate for ambient illumination reflected from the front glass plate 48. Steps 406 and 408 are preferably performed using the methods and systems described in pending U.S. patent application Ser. No. 08/036,349 and in pending U.S. patent application Ser. No. 08/240,002.

Figure 11:
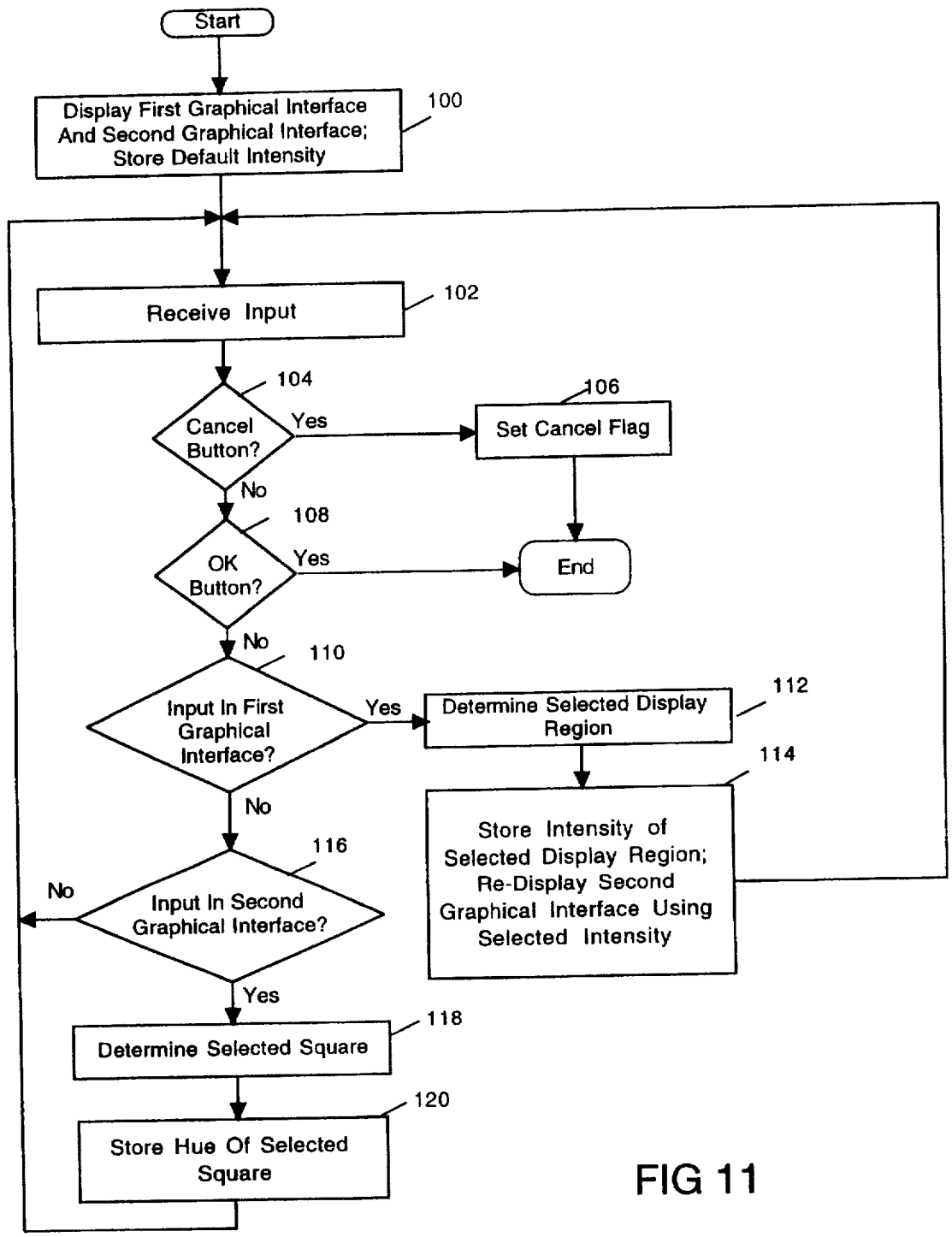
FIG. 11 is a flow chart showing the preferred method for adjusting the intensity and hue of an output of the display device to appear to match ambient illumination reflected from the reflection device.

Referring now to FIG. 11, a flow chart of a preferred method for determining the intensity and hue of an output of the display device 12 that appears to match ambient illumination reflected from a reflection device is shown. The preferred method begins in step 100 where the compensator 42 displays on the display device 12 the first graphical interface 72 and the second graphical interface, and the compensator 42 stores the current intensity setting. The system 10 receives an input from the input device 22 in step 102. The operating system 53 determines the coordinates on the display device 12 of the input and signals these coordinates. In step 104, the compensator 42 determines if the coordinates of the input are within the cancel button 74. If the coordinates are within the cancel button 74, the compensator 42 sets the cancel flag 78 in step 106, and the method ends. If the coordinates are not within the cancel button 74, the method proceeds to step 108 where the compensator 42 determines if the coordinates are within the OK button 76. If the coordinates are within the OK button 76, the method ends. In this case the compensator 42 will use the stored intensity and hue to adjust the output device 11. If the user selects the OK button 76 before selecting a display region or square, the compensator 42 will adjust the output device 11 using the default intensity and hue settings that it stored in step 100. If the coordinates are not within the OK button 76, the compensator 42 determines if the coordinates are within the first graphical interface 72 in step 110. If the coordinates are within the first graphical interface 72, the compensator 42, in step 112, determines the display region that contains the coordinates. The compensator 42 then, in step 114, stores the intensity of the selected display region and re-displays the second graphical interface 62 using the selected intensity. The intensity of the output greatly affects the appearance of the hue. See FIGS. 15A, 15B, and 15C. The system 10 preferably first receives the matching intensity, and then, after re-displaying the second graphical interface 62 using the matching intensity, receives the matching hue. After re-displaying the second graphical interface 62, the method returns to step 102.

If in step 110 the coordinates are not within the first graphical interface 72, the compensator 42 determines if the coordinates are within the second graphical interface 62 in step 116. If the coordinates are not within the second graphical interface 62, a valid input has not been entered, and the method returns to step 102 to receive another input.

If the coordinates are within the second graphical interface 62, the compensator 42 determines the selected square in step 118. Then, in step 120, the compensator 42 stores the u', v' coordinates assigned to the selected square and returns to step 102.

Figure 12:
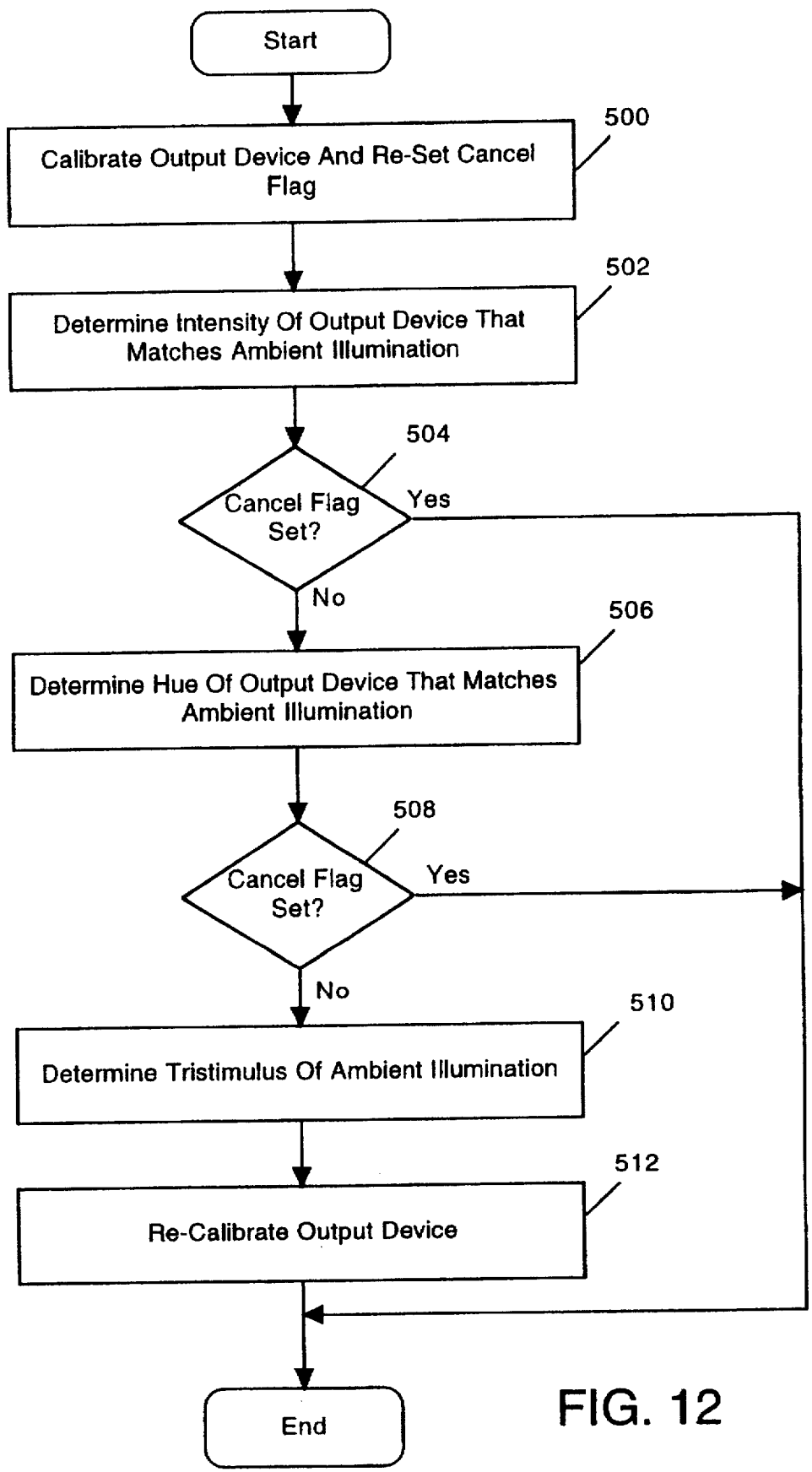
FIG. 12 is a flow chart showing an alternate method for compensating a display device for ambient illumination.

Referring now to FIG. 12, a flow chart of a second, alternate method for compensating the output device 11 for reflected ambient illumination is shown. The method is substantially similar to that shown in FIG. 10 except that the intensity and hue of outputs that appear to match the ambient illumination reflected from a reflection device are determined in sequence; first by displaying only the first graphical interface 58 and then displaying only the second graphical interface 62.

The method begins in step 500 where the compensator 42 calibrates the output device 11, and the compensator 42 resets the cancel flag 78. Once again, the compensator 42 preferably uses the method and system described in pending U.S. patent application Ser. No. 08/036,349 to calibrate the output device 11. In step 502, the compensator 42 determines an intensity that when generated by the display device 12 appears to match the ambient illumination reflected from the wand 44. Next, in step 504, the compensator 42 determines if the cancel flag 78 is set. If the cancel flag 78 is set, the method ends. Otherwise, the compensator 42, in step 506, determines a hue that when generated by the display device 12 appears to match the ambient illumination reflected from a reflection device. The methods by which the compensator 42 determines the intensity and hue will be described with reference to FIGS. 13A and 13B and FIGS. 14A, 14B, 14C, and 14D, respectively.

In step 508, the compensator 42 determines if the cancel flag 78 is set. If the cancel flag 78 is set, the method ends. Once the compensator 42 has determined an output intensity and hue that appear to match the ambient illumination reflected from a reflection device, the compensator 42 determines the tristimulus values of the ambient illumination. The compensator 42 uses the system and method described in pending U.S. patent application Ser. No. 08/240,002 to determine the tristimulus values of the ambient illumination. Finally, the compensator 42, in step 508, re-calibrates the output device 11 to compensate it for ambient illumination reflected from the front glass plate 48. The method then ends.

Figure 13A:
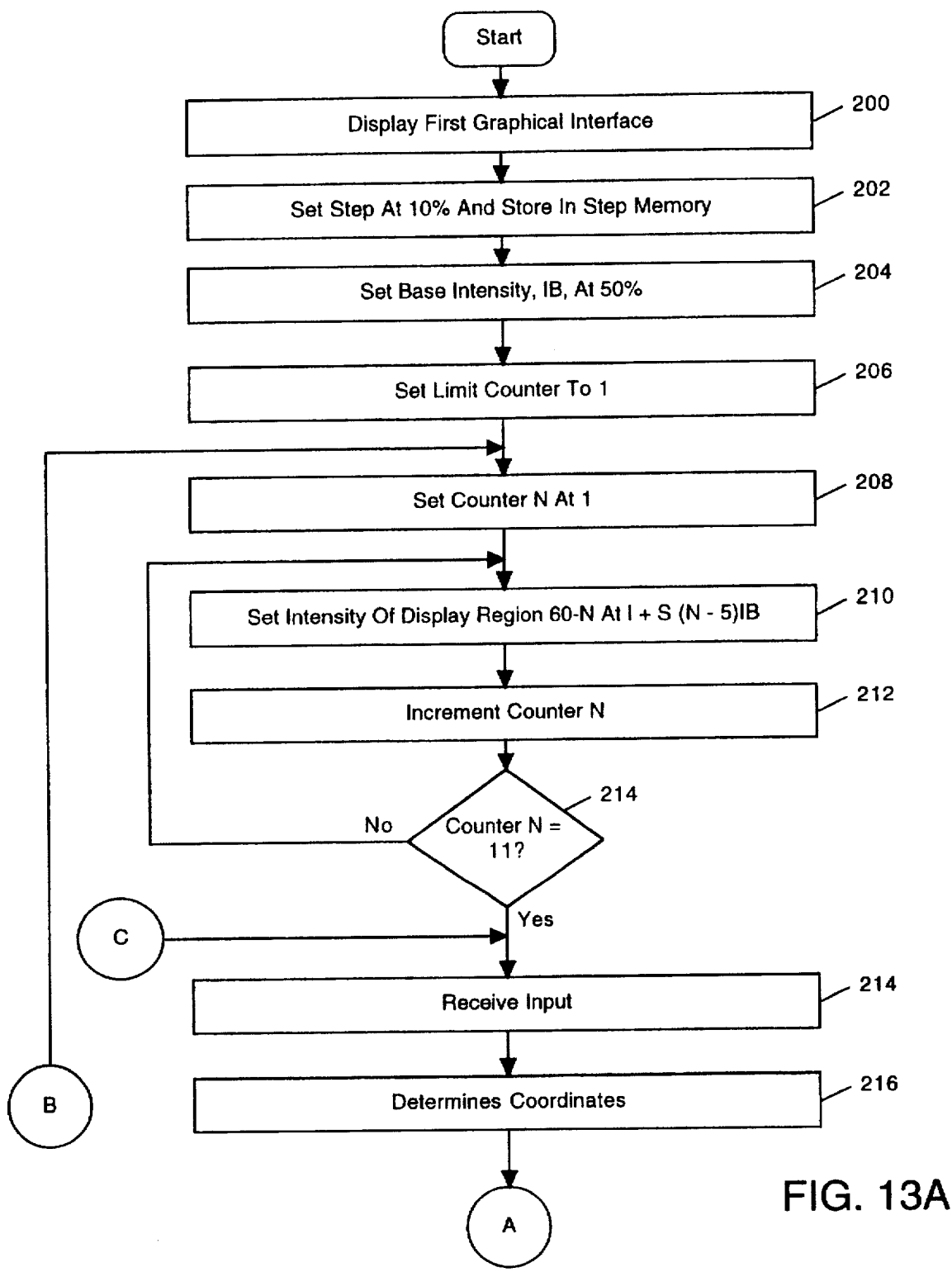
FIGS. 13A and 13B are flow charts showing a method for determining the intensity of an output that appears to match the intensity of ambient illumination reflected from a reflection device.
Figure 13B:
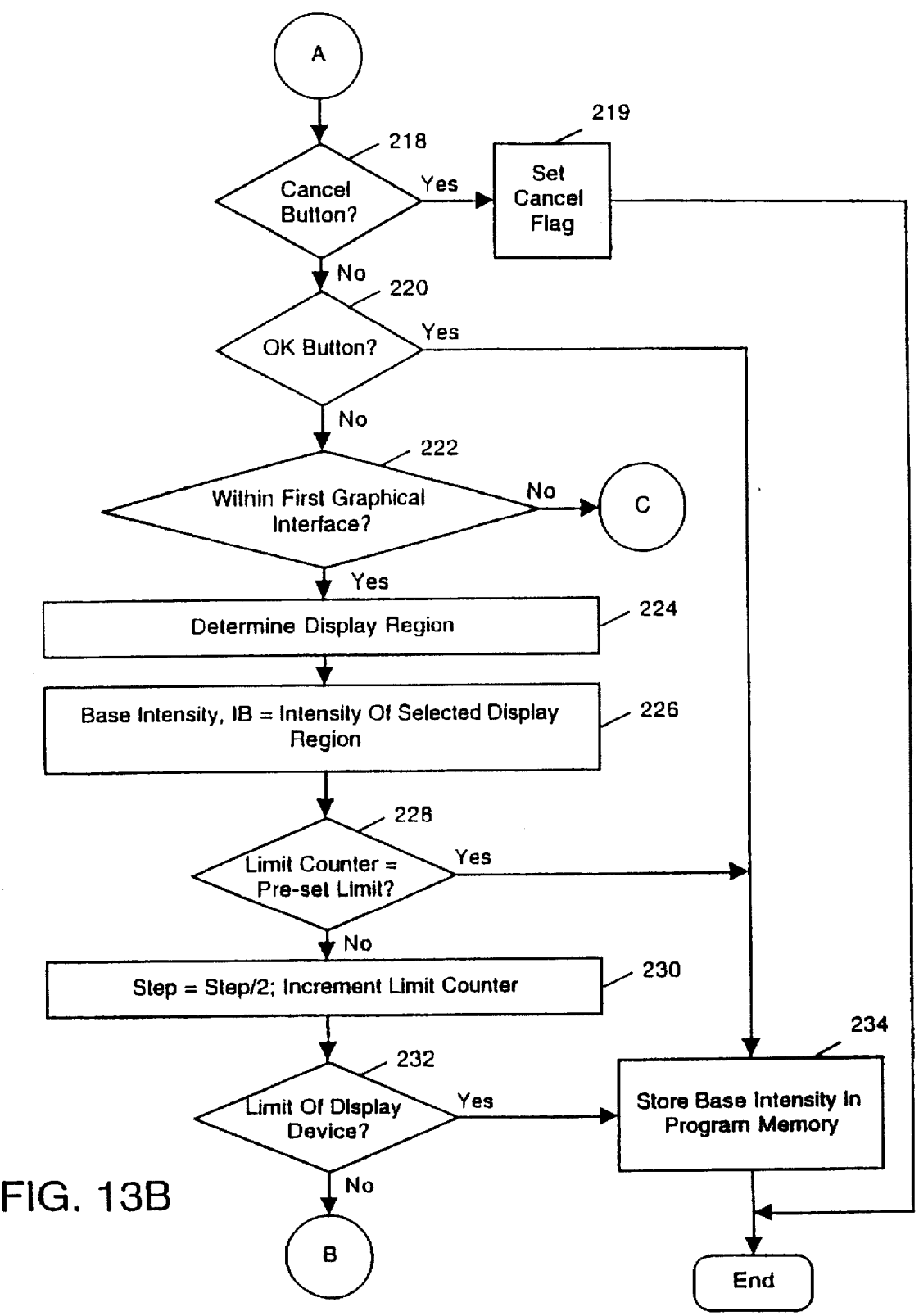
Figure 14A:
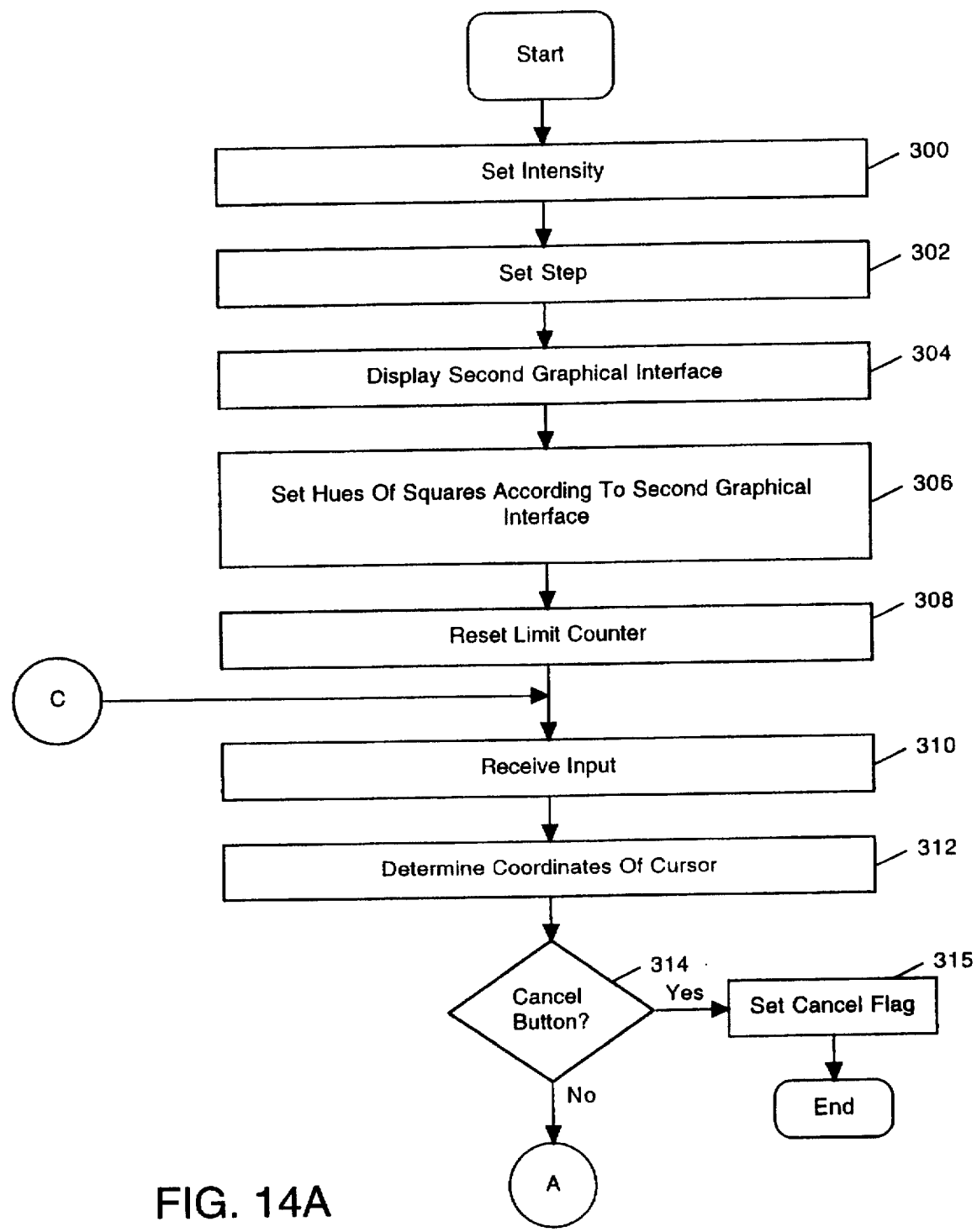
FIGS. 14A, 14B, 14C, and 14D are flow charts showing method for determining the hue of an output that appears to match the hue of ambient illumination reflected from a reflection device.
Figure 14B:
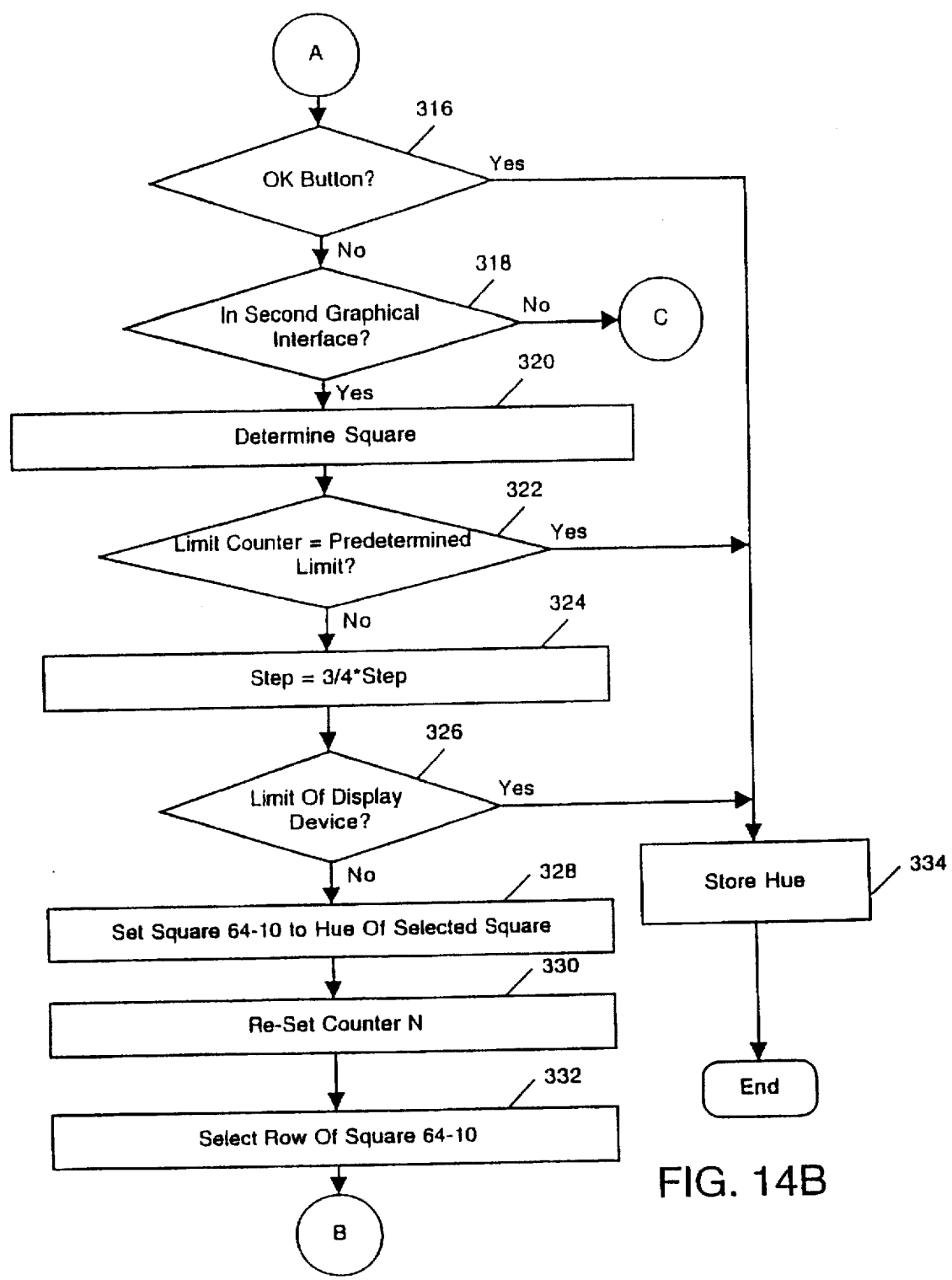
Figure 14C:
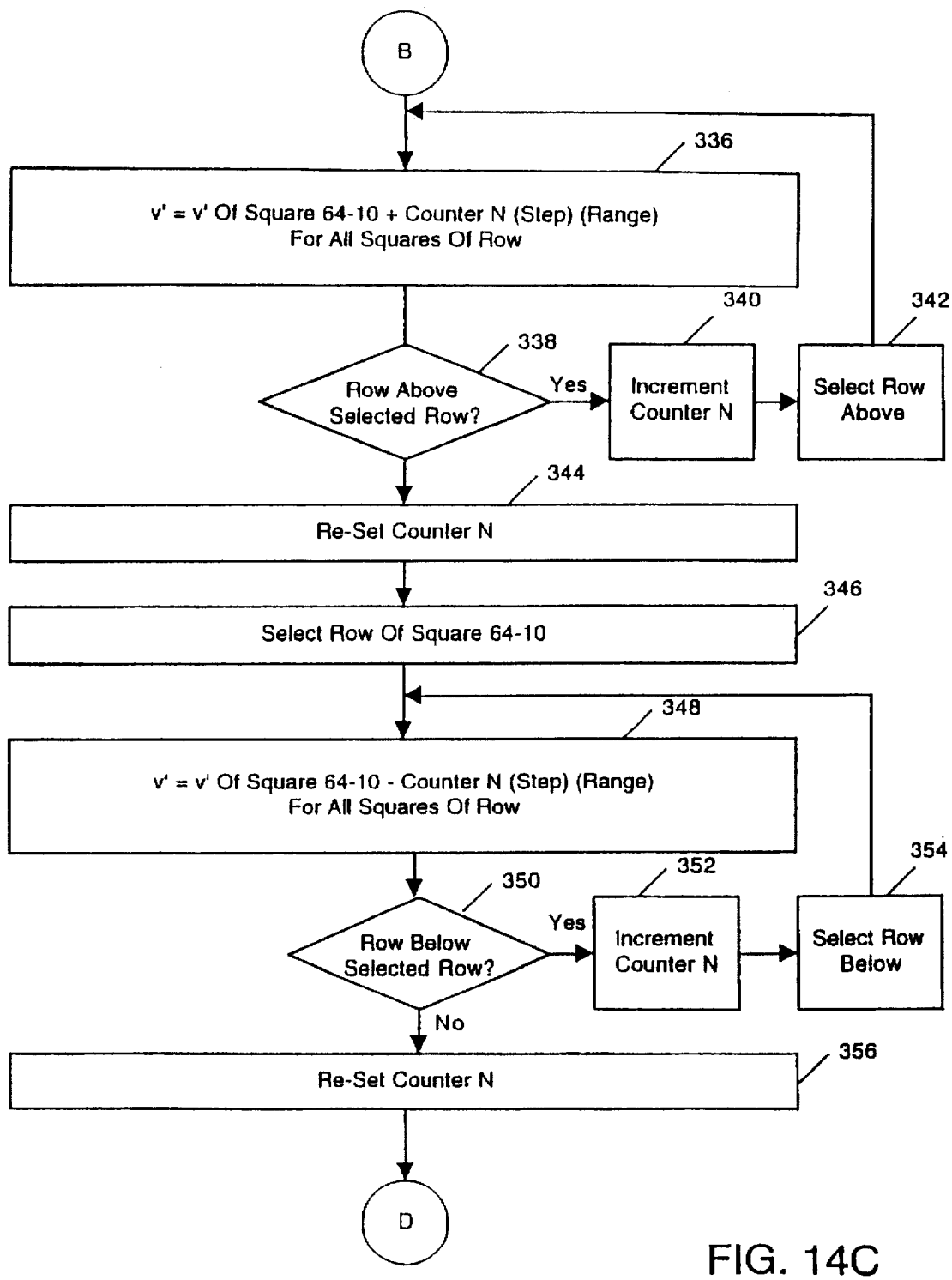
Figure 14D:
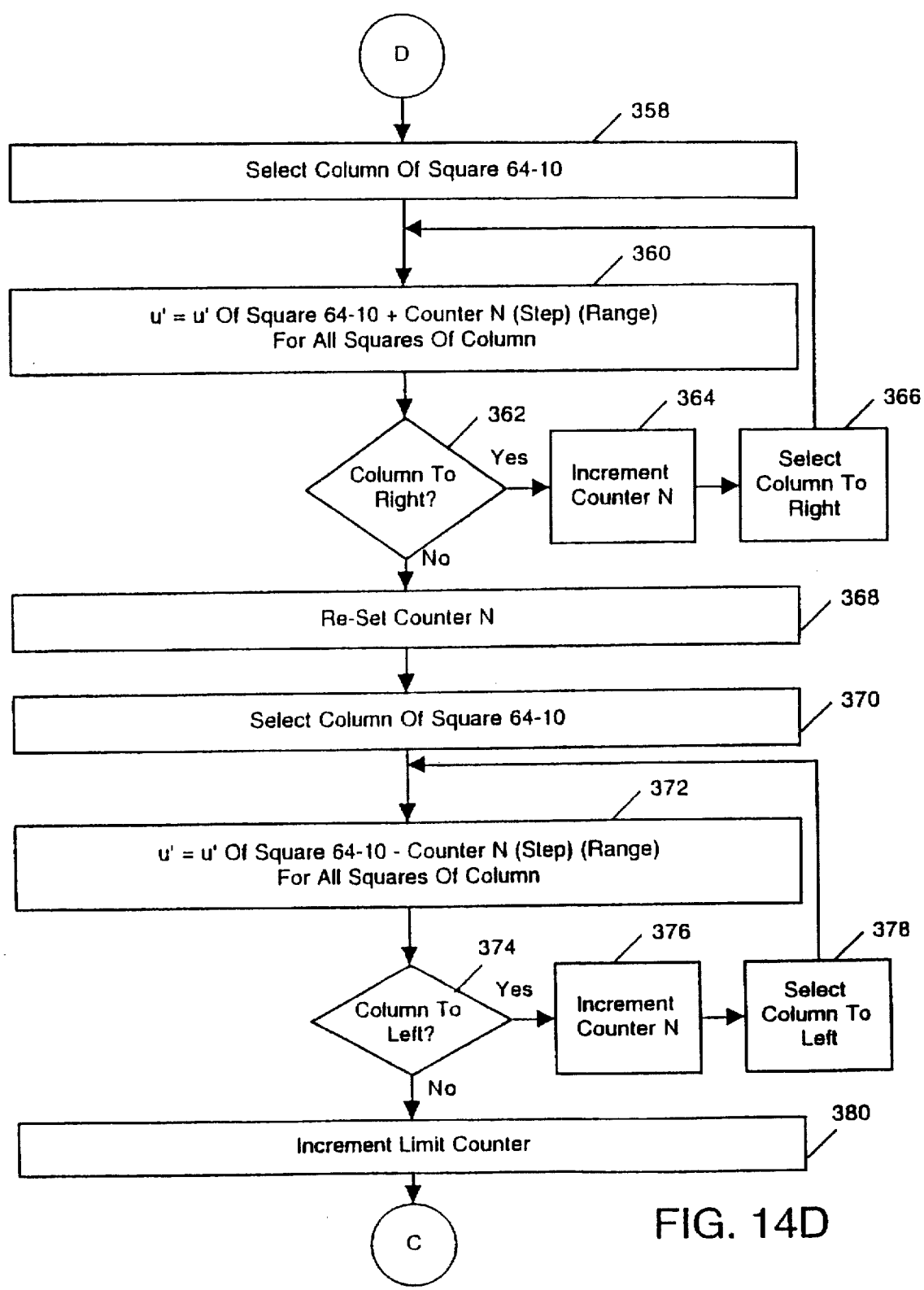

Referring now to FIGS. 13A and 13B, a flow chart of a second, alternate method for determining an output intensity that appears to match ambient illumination reflected from a reflection device is shown. The method is used for step 502 of FIG. 12 and is used with the first embodiment of the first graphical interface 58. The method shown in FIGS. 13A and 13B provides a user with an opportunity to refine the selection of an output intensity that appears to match ambient illumination reflected from a reflection device.

The method begins in step 200 where the compensator 42 signals the output device 11 to display the first graphical interface 58 on the display device 12. The compensator 42 assigns the full range of intensities to the first graphical interface 58 with a 10% step between the display regions 60-1 to 60-10. The first graphical interface 58 is preferably displayed alone as is shown in FIG. 8A. Next in step 202, the compensator 42 sets a step to 10% and stores the step in the step memory 55 shown in FIG. 3. When the compensator 42 is displaying the first graphical interface 58, the step memory 55 stores the percentage difference, in terms of the full range of intensities that the output device 11 is capable of producing, between adjacent display regions of the first graphical interface 58. For example, if the step memory 55 stores 5%, then there is a difference of 5%, of the full range of intensities that the output device 11 is capable of producing, between adjacent display regions. When the compensator 42 is displaying the second graphical interface 62, the step memory 55 stores the percentage difference, of the full range of a color that the output device 11 is capable of producing. In a manner similar to the first graphical interface 58, if the step memory 55 stores 5%, then there is a 5% step, the full range of color that the output device 11 is capable of producing between adjacent squares of the record graphical interface 62.

In step 204, the compensator 42 sets the base intensity at 50% of the full range of intensities that the output device 11 is capable of producing. The base intensity is the intensity that will appear in display region 60-5. In step 206, the compensator 42 re-sets the limit counter 80 and in step 208, the compensator 42 sets the counter N 80 shown in FIG. 3 at 1.

In step 210, the compensator 42 sets the intensity of display region 60-N at the base intensity plus the base intensity multiplied by the step and multiplied by the difference between the counter N 80 and 5 and updates display region 60-N to output the just determined intensity. N is the value of the counter N 80. For example, if the base intensity is 50%, the counter N 80 is 1, and the step is 10%, then the compensator 42 assigns 10% of the full intensity that the output device 11 is capable of producing to display region 60-1. The compensator 42 then increments the counter N 80 in step 212. In step 212, the compensator 42 determines if the counter N 80 is equal to 11. If the counter N is not equal to 11, the method returns to step 208 to assign an intensity to the next display region 60-1 to 60-10. If the counter N 80 is equal to 11, then the compensator 42 has assigned intensities to each display region 60-1 to 60-n, and the method continues in step 214.

The system 10 then receives an input in step 214. The user positions the cursor 66 on the display device 12 by manipulating the pointing device of the input device 22 and "clicks" the pointing device to generate an input. The operating system 53 determines, in step 216, the coordinates of the cursor 66 when the user "clicked" the pointing device. In step 218, the compensator 42 determines if the coordinates are within the cancel button 74. If the coordinates are within the cancel button 74, the compensator 42 sets the cancel flag 78, in step 219, and the method ends.

If in step 218 the coordinates are not within the cancel button 74, the compensator 42 determines, in step 220, if the coordinates are within the OK button 76. If the coordinates are within the OK button 76, the method proceeds to step 234 where the compensator 42 stores the current base intensity, and the method ends. Thus, if the OK button 76 is selected before an intensity is selected, the compensator 42 will re-calibrate the output device 11 using the mid-range intensity first assigned to the base intensity. If the coordinates are not within the OK button 76, the method proceeds to step 222, where the compensator 42 determines if the coordinates are within the first graphical interface 58. If the coordinates are not within the first graphical interface 58, the user has not entered a valid input. The method returns to step 214 where the system 10 receives another input.

If in step 222 the coordinates are within the first graphical interface 58, the compensator 42 determines, in step 224, in which display region 60-1 to 60-10 the coordinates lie. The display region 60-1 to 60-10 in which the coordinates lie is the selected display region 60-1 to 60-10. The compensator 42 then assigns the intensity of the selected display region 60-1 to 60-10 to the base intensity in step 226. The system 10 allows the user to select repeatedly the display region 60-1 to 60-10 that appears to match best the ambient illumination reflected from a reflection device. As the compensator 42 repeatedly displays the intensities, the compensator 42 decreases the step between the intensities of the display regions 60-1 to 60-10. This process allows the user to refine the selection of a matching intensity. The compensator 42 determines if limit counter 80 is equal to a pre-determined limit in step 228. The system 10 may have a pre-determined limit on the number of times the user may refine the selection. The pre-determined limit is stored in the compensator 42. If the limit counter 80 is equal to the pre-determined limit, the method proceeds to step 234. If the limit counter 80 is not equal to the pre-determined limit, the compensator 42 reduces the step by one-half of its current value, stores the new step in the step memory 55, and increments the limit counter 80 in step 230. The compensator 42 then, in step 232, determines if the step is below the limits of the output device 11 to differentiate intensities. Each output device 11 has a limit on its ability to differentiate intensities; reducing the step below this limit will not yield achievable differences between display regions 60-1 to 60-10. If the step is below the limits of the output device 11, the method proceeds to step 234. Otherwise, the method returns to step 208. When the method returns to step 208, the method, through the steps described above, assigns the base intensity to display region 60-5 and assigns intensities, using the reduced step, to the other display regions 60-1 to 60-10. Thus, the method allows a user to refine the intensity that appears to match best the ambient illumination reflected from a reflection device quickly and efficiently.

Referring now to FIGS. 14A, 14B, 14C, and 14D, a flow chart of an alternate method for determining an output hue that appears to match the ambient illumination reflected from a reflection device is shown. FIGS. 14A, 14B, 14C, and 14D show the method of step 504 of FIG. 12. The method begins in step 300 where the compensator 42 signals the output device 11 to set the intensity of all outputs at the level determined in step 502 of FIG. 12. The compensator 42 then, in step 302, sets the step at a fixed percentage and stores the step in the step memory 55. The user defines the percentage depending upon the user's need for precision. When using the preferred second graphical interface base on a 30 square by 30 square square, the initial value of the step is 3.3%. In step 304, the compensator 42 signals the output device 11 to display the second graphical interface 62 as is shown in FIG. 8B. The compensator 42 then, in step 306, sets the squares of the second graphical interface 62 to the hues of their initially assigned coordinates within the CIE Space and updates the second graphical interface 62. In step 308, the compensator 42 re-sets the limit counter 80.

In step 310, the system 10 receives an input through the input device 22. The operating system 53 determines the coordinates of the input in step 312 and supplies the coordinates to the compensator 42. The compensator 42 then determines if the coordinates are within the cancel button 74 in step 314. If the coordinates are within the cancel button 74, the compensator 42 sets the cancel flag 78 in step 315, and the method ends. If the coordinates are not within the cancel button 74, the compensator 42 determines if the coordinates are within the OK button 76 in step 316. If the coordinates are within the OK button 76, the method proceeds to step 334 where the compensator 42 stores the currently selected hue. The first time the compensator 42 determines if the OK button 76 was selected there will be no currently selected hue. If the OK button 76 was selected in this situation, the compensator 42 will store the hue, which it last used to determine the tristimulus values of the ambient illumination to re-calibrate the output device 11. If the OK button 76 is not selected, the compensator 42, in step 318, determines if the coordinates are within the second graphical interface 42. If the coordinates are not within the second graphical interface 62, the method returns to step 310 where the system 10 waits for an input.

If the coordinates are within the second graphical interface 62, the compensator 42 compares, in step 320, the input coordinates to the coordinates of the squares that comprise the second graphical interface 62 and determines the square within which the coordinates of the input lie. The hue of this square is the selected hue. In step 322, the compensator 42 compares the limit counter 80 to a pre-determined limit. As with the method for determining the intensity described above with reference to FIGS. 13A and 13B, the system 10 may limit a user in the number of refinements allowed. The pre-determined limit indicates the maximum number of refinements allowed and is stored in the compensator 42. If the limit counter 80 is equal to the pre-determined limit, the method proceeds to step 334. If the limit counter 80 is not equal to the pre-determined limit, the compensator 42 reduces the step by ¼ and stores the result in the step memory 55 in step 324. In step 326, the compensator 42 determines if the step is below the limits of the output device 11 to differentiate hues. If the step is below this limit, the method proceeds to step 334 where compensator 42 stores the selected hue and the method ends.

If the step is not below the limits of the output device 11, the method modifies the hues displayed by the second graphical interface 62 and allows the user to refine the selection of the hue that best matches the ambient illumination reflected from a reflection device. In step 328, the compensator 42 assigns the u', v' coordinates of the selected square to square 64-10, and in step 330, the compensator 42 re-sets the counter N 82. In step 332, the compensator 42 selects the row that contains square 64-10. Next, in step 336, the compensator 42 assigns values for the v' coordinate to each square of the selected row. The compensator 42 assigns a value that is the v' value assigned to square 64-10 plus the product of the counter N 80, the step, and the full range of values that v' may have in the second graphical interface 62. once the coordinates are assigned, the compensator 42 updates the second graphical interface 62 to display the hue of the coordinates. When using the preferred second graphical interface, the exemplary output device 11, the Apple 13" RGB with 24 bit video display card, the range of v' is 0.113. If a row would be outside the boundaries of v', that is greater than 0.548 or less than 0.427, the compensator 42 assigns no hue to that row. This situation may happen when the selected hue is originally in a far corner of the second graphical interface 62. In step 338, the compensator 42 determines if there is a row above the currently selected row. A row may comprise a single square, thus, if there are any squares above the current row, there is a row above the currently selected row.

If in step 338 there is a row above the selected row, the compensator 42 increments the counter N 80 in step 340 and selects the row above in step 342. The method then returns to step 336 to set the v' coordinate of the selected row. If in step 338 there is not a row above the selected row, the compensator 42 has set the v' coordinate of the row that contains square 64-10 and all row above that row. The method next proceeds to step 344 where the compensator 42 re-sets the counter N 80. The compensator 42 then selects the row of square 64-10 in step 346. The compensator 42, in step 348 assigns a value for the u' coordinate to all squares of the selected row a value of the v' coordinate of square 64-10 less the product of the count, the step, and the full range of the v'. The compensator 42 then updates the second graphical interface to display the hue of the assigned coordinates. Next, in step 350, the compensator 42 determines if there is a row below the currently selected row. If there is such a row, the compensator 42 increments the counter N 80 in step 352 and, in step 354, selects the row below the currently selected row. The method then returns the step 348 to set the v' coordinate for all squares of the selected row.

If in step 350 there is not a row below the selected row, the compensator 42 has assigned values for the v' coordinate for all the squares of the second graphical interface 62. In step 356, the compensator 42 re-sets the counter N 80. In step 358, the compensator 42 selects the column of the second graphical interface 62 that contains square 64-10. The compensator 42 then sets the u' coordinate assigned to each square of the selected column to the value of the u' coordinate of square 64-10 plus the product of the counter N 80, the step, and the full range of the u'. Once the u' coordinates are assigned, the compensator 42 updates the display of the second graphical interface 62. With the preferred second graphical interface and exemplary output device 11, the range of u' is 0.127. As with v', if the square is to receive a u' coordinate outside the range of u', that is greater than 0.310 or less than 0.183, the square receives no hue. The compensator 42 then determines if there is a column to the right of the currently selected column. Any square to the right of a square of the currently selected column constitutes a column to the right of the currently selected column. If there is such a column, the compensator 42 increments the counter N 80 in step 364 and selects the column immediately to the right of the currently selected column in step 366. The method then returns to step 360 to set the u' coordinate of the squares of this column.

If in step 362 there is no column to the right of the currently selected column, the compensator 42 re-sets the counter N 80 in step 368 and selects the column that contains square 64-10 in step 370. The compensator 42 then, in step 372, sets the u' coordinate of all squares of the selected column to the value of the u' coordinate of square 64-10 less the product of the counter N 80, the step, and the full range of the u' coordinate, and the compensator 42 updates the display of the second graphical interface 62. Next, in step 374, the compensator 42 determines if there is a column to the left of the currently selected column. Once again, any square to the left of a square of the currently selected column constitutes a column to the left of the currently selected column. If there is such a column, the compensator 42 increments the counter N 80 in step 376 and selects the next column to the left of the currently selected column in step 378. The method then returns to step 372 to set the u' coordinate of the squares of the currently selected column. If in step 374 there is no column to the left of the currently selected column, the compensator 42 has assigned u', v' coordinates to all squares of the second graphical interface 62. The compensator 42 increments the limit counter 80 in step 380, and the method returns to step 310 so that the user may select a square the most closely matches the ambient illumination reflected from a reflection device.

Figure 15A:
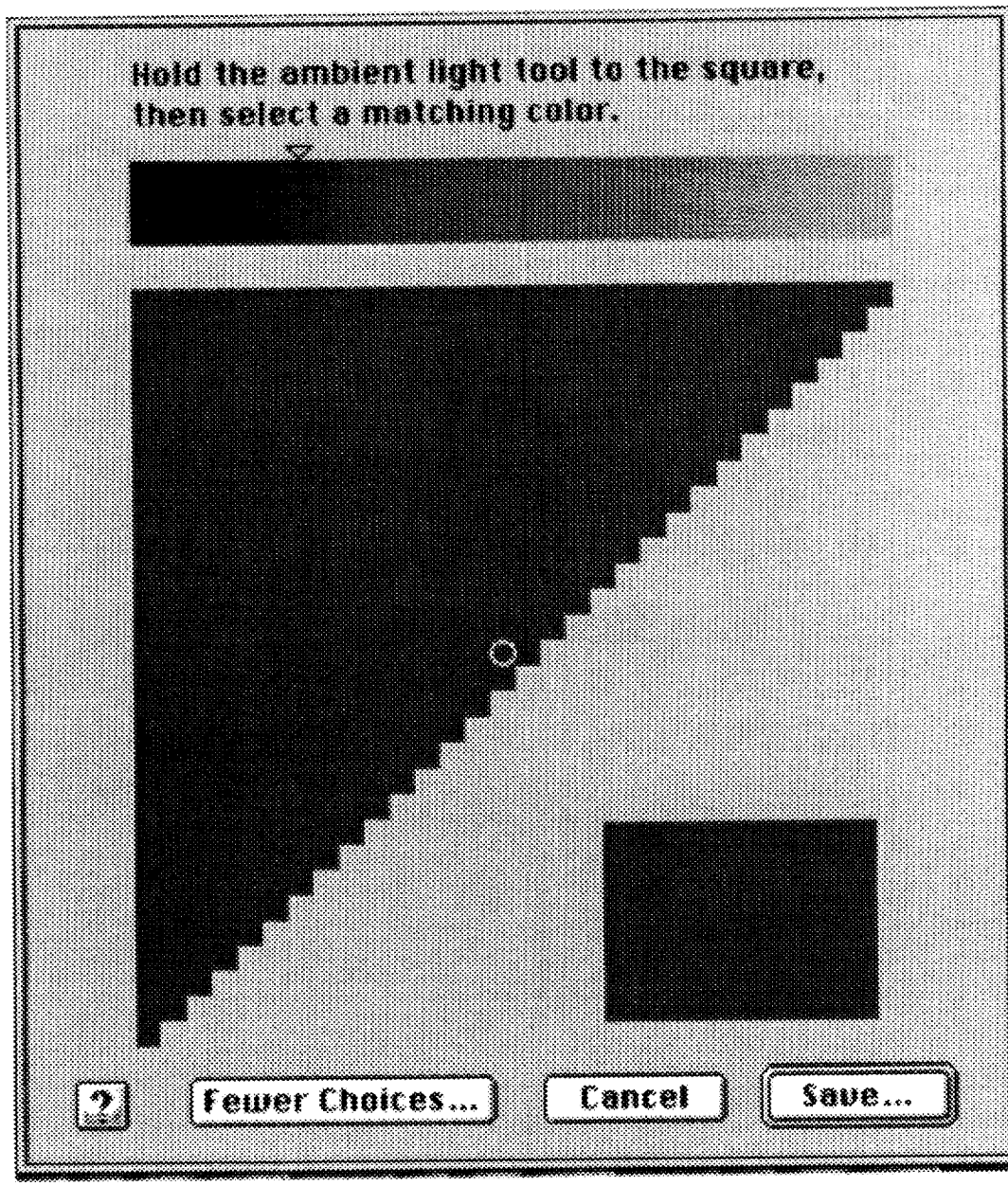
FIGS. 15A, 15B, and 15C are prints of the output of a display device showing the preferred embodiment of the first graphical interface and second graphical interface with, in order, a low intensity, mid intensity and high intensity.
Figure 15B:
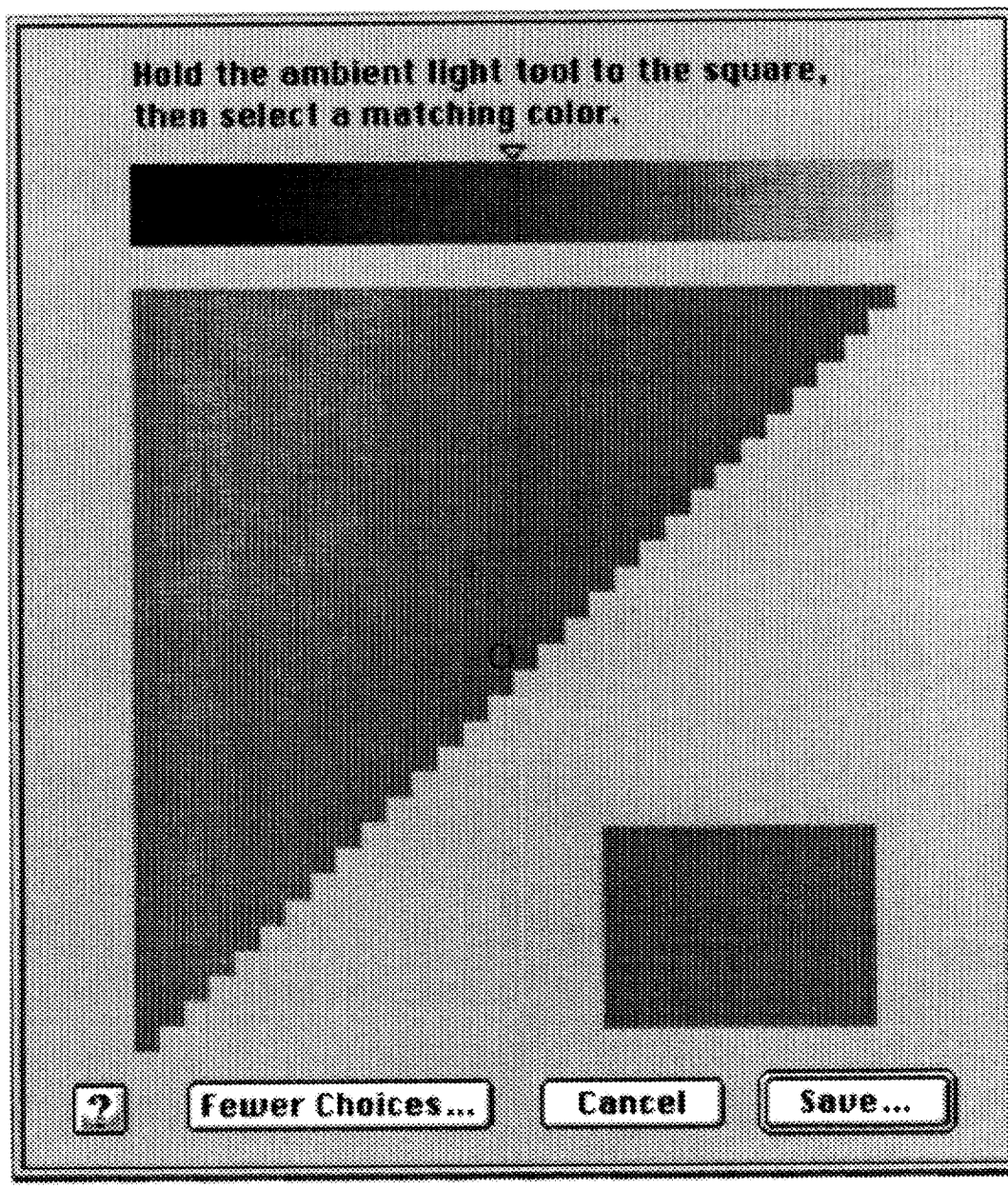
Figure 15C:
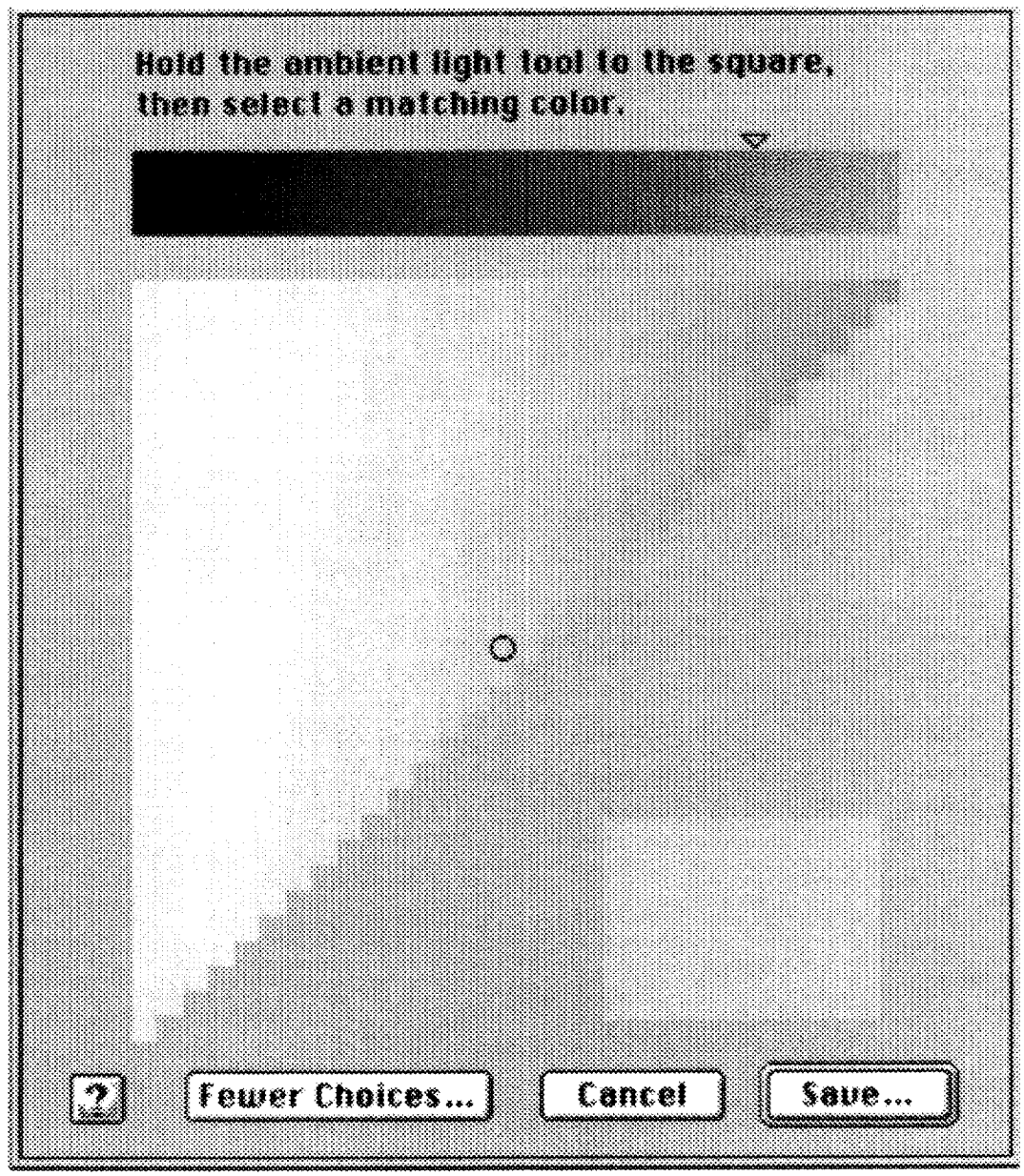

Referring now to FIGS. 15A, 15B, and 15C, snap shots of the output of the display device 12 are shown. FIG. 15A shows an output of a display device 12, set at a low intensity, displaying a first graphical interface and a second graphical interface. FIG. 15B again shows a first and second graphical interfaces with the intensity set at a mid-level. Finally, FIG. 15C shows a first and second interface with the intensity set at a high level.

While the present invention has been described with reference to certain preferred and alternate embodiments, those skilled in the art will recognize that other alternate embodiments exist. Another alternate embodiment would comprise a look up table. The look up table comprises entries for every square of the second graphical interface 62. Each entry includes values for each of the R, G, and B channels for every value that the step can take. An alternate method for use with this alternate embodiment includes the steps of:

1) receiving an input signal indicating the square that appears to match ambient illumination reflected from a reflection device;

2) preparing a coordinate shift to place the selected square at square 64-10;

3) reducing the step; and 4) setting the hues according to the value for each square as indicated by the step.

These and other variations upon and modifications to the preferred and alternate embodiments are provided for by the present invention, which is limited only by the following claims.

What is claimed is:

1. A system for adjusting color and intensity to compensate for reflected ambient illumination, the system comprising:

an output device having a controllable output and an input for receiving an output signal to be output on the output device;

a processor, having inputs and outputs, an output of the processor coupled to the output device;

a compensator, having inputs and outputs coupled to the processor, for adjusting an output signal from the processor to the output device to compensate the output device for the effects of ambient illumination; and a reflection device having pre-determined reflectivity characteristics, for comparing to the output of the output device, the reflection device defining an aperture having a diameter less than 1.75 centimeters.

2. A system for adjusting color and intensity to compensate for reflected ambient illumination, the system comprising:

an output device having a controllable output and an input for receiving an output signal to be output on the output device;

a processor, having inputs and outputs, an output of the processor coupled to the output device;

a compensator, having inputs and outputs coupled to the processor, for adjusting an output signal from the processor to the output device to compensate the output device for the effects of ambient illumination; and a reflection device having pre-determined reflectivity characteristics, for comparing to the output of the output device, the reflection device defining an aperture having a diameter less than 1.75 centimeters and comprising a handle and a disk portion, coupled to the handle.

\* \* \* \* \*